Dec. 29, 1959 D. G. C. LUCK 2,919,303

SYSTEM OF COMMUNICATION EMPLOYING PICTORIAL DISPLAY AND TIME MULTIPLEXING

Filed June 28, 1952 6 Sheets-Sheet 1

INVENTOR
David G.C. Luck
BY Floyd M. Harris
ATTORNEY

INVENTOR
David G.C. Luck
BY
Floyd M. Harris
ATTORNEY

INVENTOR
David G. C. Luck
BY
Floyd M. Harris
ATTORNEY

Dec. 29, 1959 D. G. C. LUCK 2,919,303

SYSTEM OF COMMUNICATION EMPLOYING PICTORIAL DISPLAY AND TIME MULTIPLEXING

Filed June 28, 1952 6 Sheets-Sheet 4

INVENTOR
David G. C. Luck
BY
Floyd M. Harris
ATTORNEY

INVENTOR.
David G.C. Luck
BY Floyd M. Harris
ATTORNEY

INVENTOR.
David G. C. Luck
BY Floyd M. Harris
ATTORNEY

United States Patent Office 2,919,303

Patented Dec. 29, 1959

2,919,303

SYSTEM OF COMMUNICATION EMPLOYING PICTORIAL DISPLAY AND TIME MULTIPLEXING

David G. C. Luck, Princeton, N.J., assignor to Radio Corporation of America, a corporation of Delaware Application June 28, 1952, Serial No. 296,161

26 Claims. (Cl. 178—5.6)

My invention relates to multiple channel radio communication systems of the pictorial display transmission type.

More particularly, the invention relates to communication systems of a type suitable for controlling traffic such as aircraft coming into an airport where it is desired to communicate from a control point at the airport to a selected aircraft and to receive an acknowledgement from that aircraft. Systems of this type are of general utility and may be used for communication to a fleet of taxicabs, for harbor control, and for various other purposes. For the purpose of illustration, the invention will be described with respect to its use for aircraft control.

It may be noted that the present invention is particularly applicable to the control or coordination of traffic where such control may be accomplished by transmitting selectively from a central control point to each of many aircraft or vehicles messages selected from a group of standardized or conventionalized messages, and where each aircraft or vehicle should report promptly to the central control point receipt of the message and execution of it. By employing standardized messages and standardized reply codes, adequate information may be transmitted in both directions, yet the frequency spectrum required for the system operation may be comparatively narrow.

An object of the invention is to provide an improved radio communication system that will not occupy a frequency spectrum of undue width and which will provide a large number of separate communication channels.

A further object of the invention is to provide an improved communication system wherein there is a two-way private line between a central point and each of a plurality of remote points.

A further object of the invention is to provide an improved pictorial display communication system wherein pictorial displays may be transmitted from a central point to different remote receiving points in rapid succession.

A further object of the invention is to provide an improved air traffic control signalling system that utilizes pictorial transmission from ground to aircraft and that utilizes time multiplex reply transmission from aircraft to ground.

A still further object of the invention is to provide an improved time multiplex communication system of the type wherein there is transmission from a plurality of transmitting points to a central receiving point.

In the example to be described, sixty-four communication channels are provided so that landing instructions and the like may be transmitted to as many as sixty-four different aircraft in rapid succession if desired, and so that the pilot in each aircraft may acknowledge at any time receipt of instructions, may advise of execution of instructions, et cetera.

Only the aircraft assigned to a particular channel will receive the instructions transmitted on that channel. Also, when that aircraft transmits an acknowledgement, only the airport controller will receive the acknowledgement. Furthermore, any acknowledgement from said aircraft will appear on an acknowledgement panel assigned to said particular channel.

Thus, in effect, there is an individual two-way private line or channel from the airport ground station to each individual aircraft.

The transmission from the ground control station to the various aircraft is picture transmission similar to television. As in television, both picture and synchronizing pulses are transmitted. In addition, address code pulses are transmitted at the beginning of each picture frame. Different code pulses are assigned to different channels so that the transmitted picture message is received by the desired aircraft, and only by that aircraft.

The acknowledgement reply from aircraft to ground is a pulse code reply. Each aircraft may transmit any one of several codes, each having a different pre-assigned meaning. The acknowledgement code pulses are transmitted during a horizontal scanning line period assigned to the particular communication channel that the aircraft is using.

In the embodiment of the invention here illustrated by way of example, television transmission at a rate of one picture frame per second has been assumed. One distinct message may be sent per second without exceeding the capabilities of the assumed system, provided the controller is able to supply and route new messages at such a rapid rate. For instance, at one or two second intervals the controller might successively push channel selecting buttons 51, 43, 18, 60, et cetera, the button numbering corresponding to the assigned channel numbers. It is apparent that messages may be transmitted to a large number of aircraft in less than a minute.

At the aircraft, the received message appears on a cathode ray indicator tube of the storage type so that a message picture remains on the indicator tube screen for several minutes if desired.

The pilot of an aircraft pushes a suitable acknowledge button at any time that it is convenient for him to do so. This sets up the reply code, and the coded acknowledgement reply will then be transmitted an instant later during the occurrence of an assigned picture line. For example, if channel 52 is the one assigned to this particular aircraft, then the acknowledgement will be transmitted during the scanning time of line 56 of the picture in the particular embodiment illustrated.

At the airport control station the acknowledgement code will be received by a reply code receiver, decoded, and applied to the acknowledgement panel, all during the time assigned to picture line 56.

From the foregoing it will be apparent that one of the important features of the present invention is the tie-in of the picture synchronizing signals and the code reply transmission. The picture synchronizing signals actually have a double use. In addition to performing their normal function of synchronizing the picture, they determine the time intervals for the acknowledgement code replies from the aircraft. In this way, time multiplex channels for acknowledgement are controlled at the aircraft by synchronizing signals transmitted from the ground station. As indicated above, the ground station location is also the location of the receiver for the acknowledgement code reply pulses.

Other objects, features, and advantages of the invention will be apparent from the following description taken in connection with the accompanying drawing in which.

Figure 1:
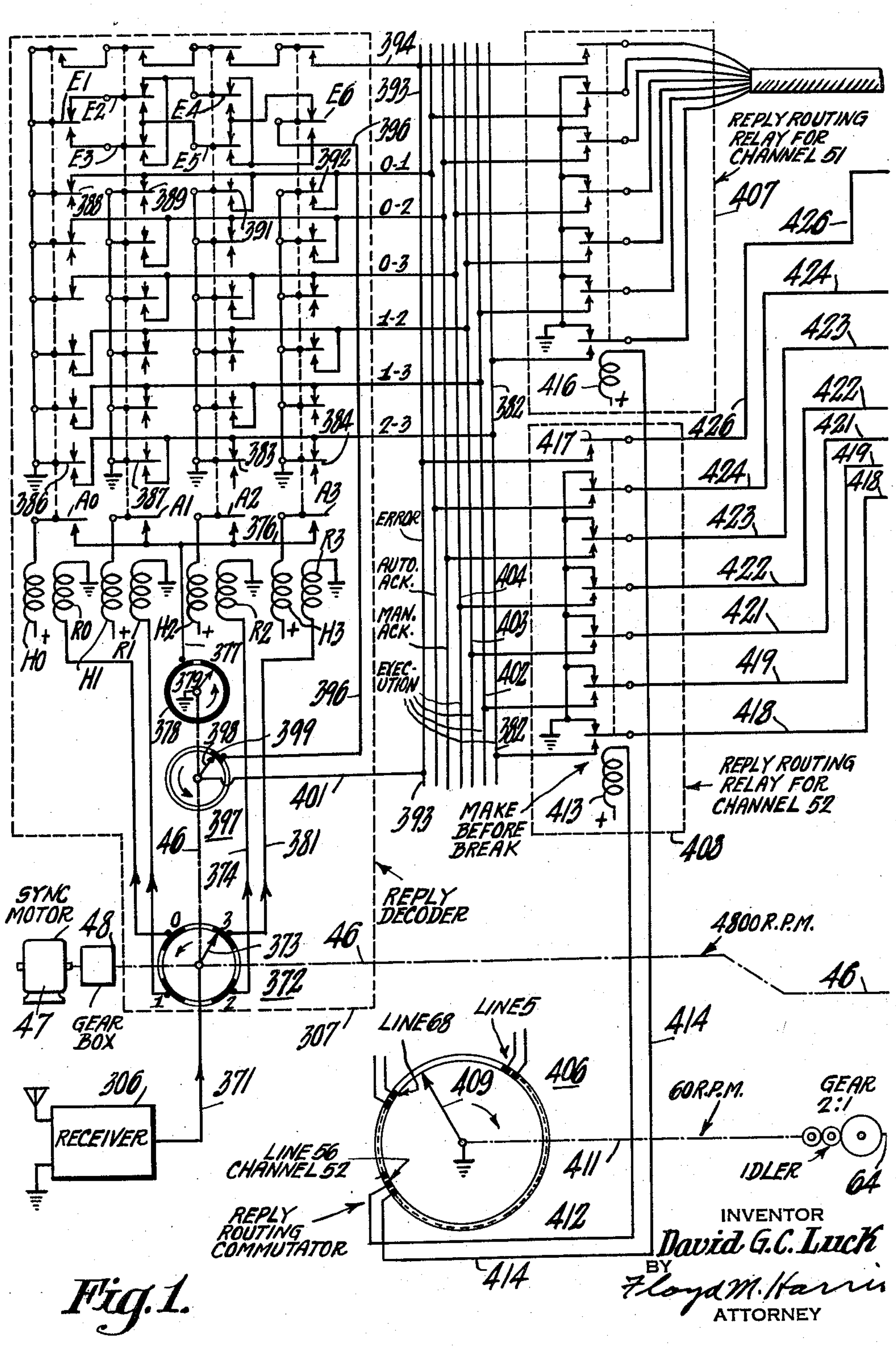
Fig. 1 is a circuit and block diagram of a portion of the ground equipment of an embodiment of the invention.
Figure 2:
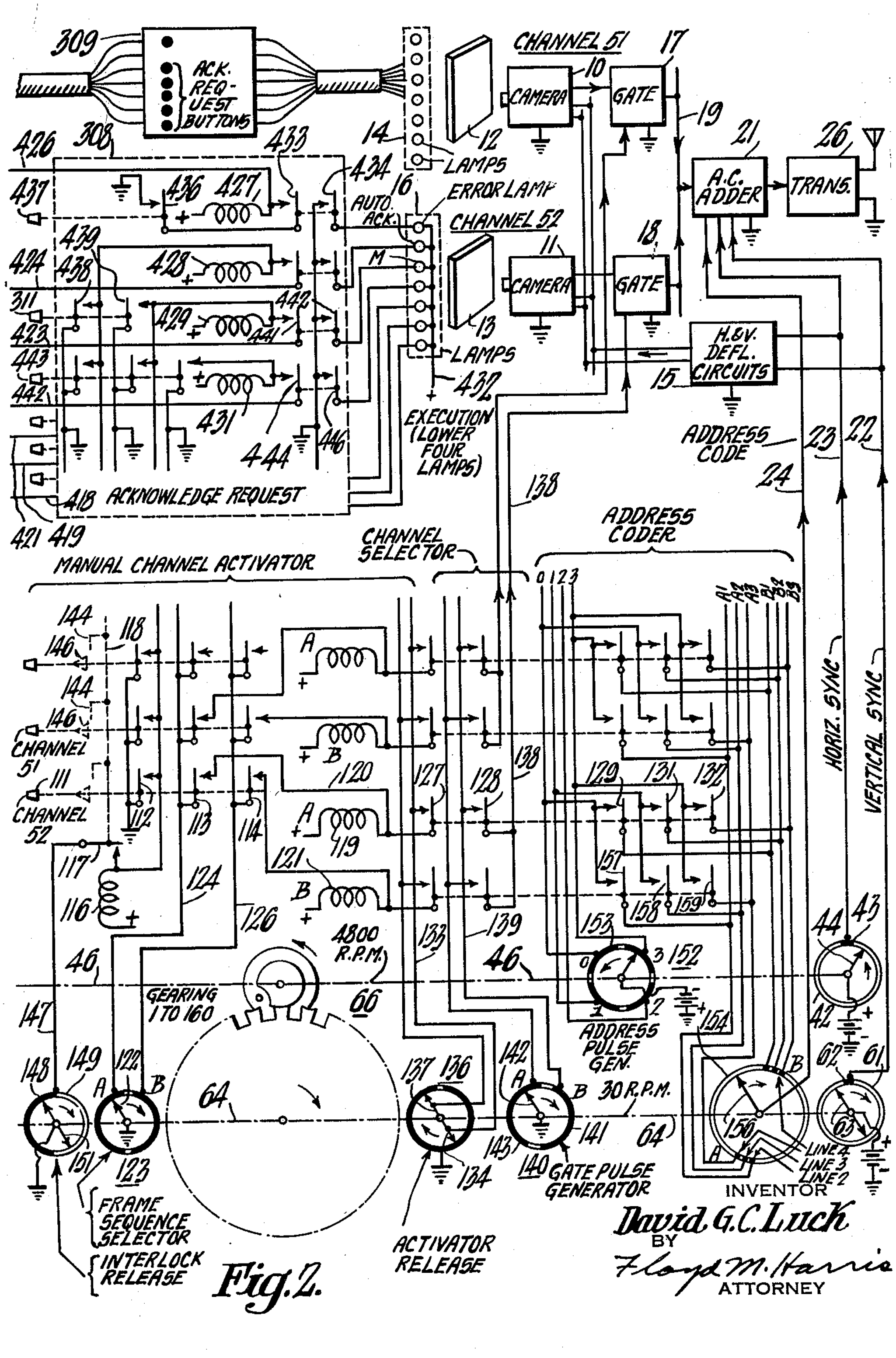
Fig. 2 is a circuit and block diagram of the remaining portion of said ground equipment.

The two drawing sheets on which Figs. 1 and 2 appear should be placed side by side to show the complete ground equipment. Likewise, the two sheets on which Figs. 3 and 4 appear should be placed side by side to show the complete aircraft equipment.

In the several figures similar parts are indicated by similar reference characters.

The system can best be understood by considering (1) the pictorial transmission from the ground station to an aircraft and its reception at the aircraft, and (2) the acknowledge code transmission from the aircraft to the ground station and its reception at the ground station.

PICTORIAL TRANSMISSION AND RECEPTION

Figure 5:
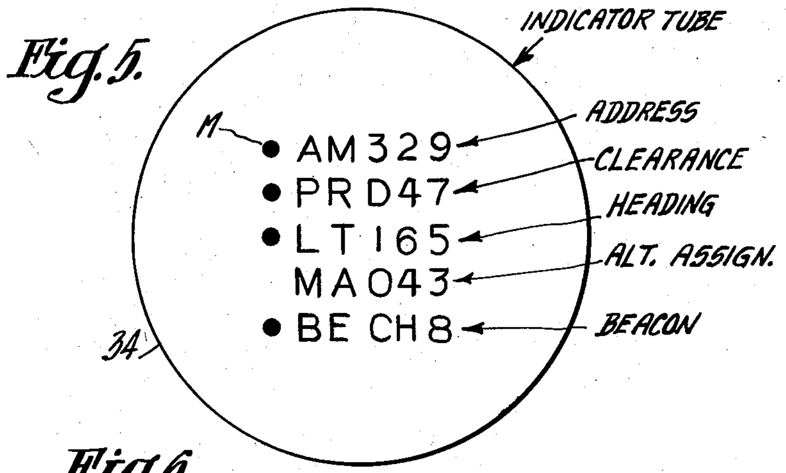
Fig. 5 is a view illustrating, by way of example, the pictorial information that may appear on the viewing tube of the aircraft equipment.

The pictorial transmission system is shown in Fig. 2 where two of the sixty-four communication channels are illustrated. Each channel includes a camera that picks up messages that are displayed on a display board. An example of such a message is shown in Fig. 5.

Channels 51 and 52, illustrated by way of example, include cameras 10 and 11, respectively, and their associated display boards 12 and 13 on which message legends appear. For an example of such legends see Fig. 5.

Each camera preferably picks up and transmits, in addition to the message legends, a view of the lower five lights on an acknowledgement panel for a reason that will be apparent later. These panels are indicated at 14 and 16 in channels 51 and 52, respectively.

Horizontal and vertical deflection for the cathode ray beams of the camera pick-up tubes are provided in the usual manner by means of horizontal and vertical deflection circuits 15. This produces the usual television type scan. Deflection circuits 15 are synchronized by horizontal and vertical synchronizing pulses from leads 23 and 22, respectively.

The video signals from cameras 10 and 11 are supplied to normally closed gate circuits 17 and 18, respectively. The gate output circuits are connected to a bus lead 19 for supplying signal from any open gate to an alternating current adding circuit 21.

Vertical synchronizing signal, horizontal synchronizing signal, and address code signal are supplied from the leads 22, 23, and a lead 24, respectively, to the adder 21. The combined output of adder 21 is supplied to a radio transmitter 26 and radiated to the aircraft. An example of this combined output is shown by the graph *a* in Fig. 8.

From the foregoing it will be seen that there is transmitted by way of any selected channel the video signal, the synchronizing signal and the address code.

As indicated by the legends in Fig. 2, the pictorial display transmitter also includes means for selecting and activating a desired channel, and means for producing and transmitting the correct adress code for said desired channel. Before discussing this portion of the circuit, reference will be made to the aircraft pictorial display receiver shown in Fig. 3.

Figure 3:
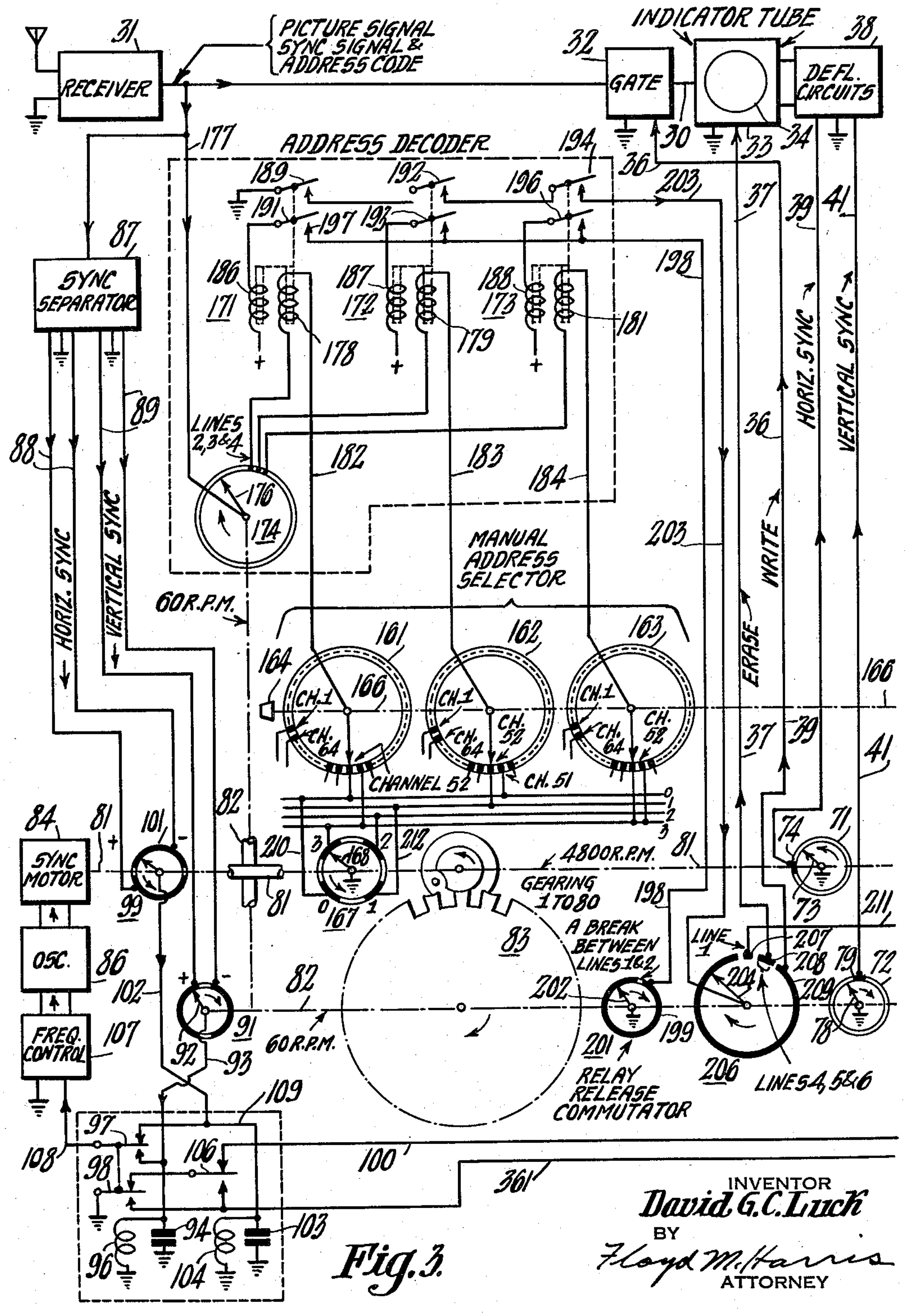
Fig. 3 is a circuit and block diagram of a portion of the aircraft equipment of said embodiment of the invention.

The aircraft picture receiver, shown in Fig. 3, comprises a television receiver 31 at the output of which appears the transmitted picture signal, synchronizing signal and address code. This output signal is supplied to a normally closed gate circuit 32 through which signal may be applied to an indicator tube 33 of the cathode ray storage tube type.

As will be described in some detail later, the picture will be written on the fluorescent screen 34 of the tube 33 when the gate 32 is opened by a ground connection being put on a lead 36. This picture will remain on the screen 34 for several minutes unless it is erased as a result of ground being put on a lead 37.

Deflection circuits 38 supply horizontal and vertical deflection waves for the writing beam of the indicator tube 33. Synchronization of deflection is provided by horizontal and vertical synchronizing pulses supplied over leads 39 and 41 respectively. The synchronization of the transmitter deflection circuits and the receiver deflection circuits 38 will now be discussed in more detail.

*Synchronization of the pictorial transmission and reception*

AT THE TRANSMITTER—FIG. 2

For illustration purposes it is assumed that an eightly (80) line (non-interlace) picture is to be transmitted at a frame rate of one frame per second. Thus, there are sixty (60) vertical synchronizing pulses per minute and 4800 horizontal synchronizing pulses per minute.

In the present example, referring to Fig. 2, the horizontal synchronizing pulses are generated at a commutator 42 having a conducting segment 43. A rotatable commutator arm or brush 44 is mounted on a shaft 46 and is rotated thereby at 4800 revolutions per minute in the direction indicated by the arrow. Thus, the segment 43 is connected to a battery periodically to produce a synchronizing pulse immediately preceding each horizontal scanning line.

The shaft 46 is driven by a synchronous motor 47 (see Fig. 1) through a gear box 48.

The vertical synchronizing pulses are generated at a commutator 61 having a conducting segment 62. A double-ended commutator arm or brush 63 is rotated at 30 revolutions per minute in the direction indicated by the arrow. It wipes segment 62 twice per rotation, connecting it to a battery each time, to produce 60 vertical synchronizing pulses per minute. Each vertical synchronizing pulse occurs immediately preceding a vertical deflection and has a duration greater than that of a horizontal synchronizing pulse to permit separation of horizontal and vertical synchronizing pulses.

In the present example, the first six horizontal scanning lines are required for the vertical deflection return.

The double-ended commutator arm 63 is mounted on a low-speed shaft 64 which is driven at 30 r.p.m. from the high-speed shaft 46 through suitable gearing 66. Since the shaft 46 is to rotate at 4800 r.p.m. or 80 times per second, the gear ratio is 1 to 160. Preferably the gearing 66 is of the Geneva movement type so that the shaft 64 is stepped around. In order to conserve drawing space, no attempt has been made to draw the Geneva movement to scale. This causes certain commutator arms that are mounted on the shaft 64 to dwell on commutator segments, as will be apparent hereinafter. The result is that the commutators need not be built with tolerances as close as would be required with straight gearing. However, straight gearing may be employed if desired.

It should be understood that the picture frame rate and the number of picture lines are given merely by way of example. As to the frame rate, for example, the motor 47 may be run at either a slower rate or a faster rate than the one mentioned in the specific example described.

AT THE RECEIVER—FIG. 3

At the aircraft picture receiver shown in Fig. 3, noise-free horizontal and vertical synchronizing pulses are generated locally at commutators 71 and 72, respectively. At commutator 71 a rotatable arm 73 wipes a conducting segment 74 to ground it (or connect it to a battery) and apply a horizontal synchronizing pulse to the lead 39. Similarly at commutator 72 a rotatable arm 78 wipes a segment 79 to apply a vertical synchronizing pulse to the lead 41.

The arms 73 and 78 of the synchronizing pulse commutators are mounted on shafts 81 and 82, respectively, for rotation thereby. The shaft 82 is driven by the shaft 81 through gearing 83 having a 1 to 80 gear ratio. As described in connection with the ground transmitter, the gearing 83 preferably is of the Geneva movement type so that the various slow commutators will not have to be built to such close tolerances.

The synchronizing pulses taken off commutators 71 and 72 obviously must be maintained in synchronism with the transmitted synchronizing pulses. This is accomplished by driving the shaft 81 by a synchronous motor 84, and by driving the motor 84 from an oscillator 86 that is under the control of an automatic frequency control (AFC) circuit 107.

The AFC circuit and operation are as follows:

A portion of the output from receiver 31 is supplied to a synchronizing pulse separator 87 which separates synchronizing signal from the picture signal according to conventional television practice. Separator 87 also separates vertical and horizontal synchronizing pulses from each other by means of well-known circuits so that only horizontal synchronizing pulses appear on the pair of leads 88, and only vertical synchronizing pulses appear on the pair of leads 89.

The horizontal and vertical synchronizing pulses have each been passed through amplifier circuits that convert from single-ended to push-pull. Therefore signals of opposite polarity with respect to ground appear on the two leads 88. The same is true as to leads 89.

Referring first to the vertical synchronizing or framing circuit, the vertical synchronizing signal from leads 89 is applied to diametrically opposed conducting segments of a commutator 91. The rotatable arm 92 of this commutator is mounted on the low-speed shaft 82 and is driven thereby.

If the transmitted vertical synchronizing pulse is received at the instant the arm 92 is vertical and pointed up, the pictures are properly framed. No signal will then be transmitted over the lead 93 to apply a charge on a capacitor 94. Therefore, the relay coil 96 will not be energized and its armatures 97 and 98 will be in the "up" position.

Referring to the horizontal synchronizing circuit, the horizontal synchronizing signal from leads 88 is applied to the diametrically opposed conducting segments of a commutator 99. The rotatable arm 101 of this commutator is mounted on the high-speed shaft 81 for rotation thereby.

If the transmitted horizontal synchronizing pulse is received at the instant the arm 101 is pointed horizontally to the left the pictures are in line synchronism. No net signal will then be transmitted over the lead 102 to apply a charge on a capacitor 103. Therefore, the relay coil 104 will not be energized, and its armature 106 will be in the "up" position. The function of relay armatures 98 and 106 is to take ground off a lead 100 and thereby prevent false acknowledgements when the system is out of synchronization. This function need not be considered at this point.

From the foregoing it is evident that if the system is in synchronism, the oscillator frequency control circuit 107 is connected by way of a lead 108, the armature 97, a lead 109, and the capacitor 103 to ground. There being no charge on capacitor 103, the lead 108 is at ground in the example given.

The frequency control circuit 107 may be a reactance tube or any suitable circuit for controlling the frequency of the oscillator 86.

If the receiver deflection now starts to get out of horizontal synchronization, the commutator arm 101 will be on one of the conducting segments during a larger portion of the received synchronizing pulses than it is on the other segments so that a net voltage will be applied to the capacitor 103. Capacitor 103 will be charged plus or minus depending upon whether the shaft 81 is rotating too fast or too slow. Thus a voltage is applied to the frequency control unit 107 such as to pull the synchronous motor 84 to the correct speed. During this action the armature 106 is pulled down to take ground off the lead 100 to prevent a false acknowledgement.

The contact or brush element at the end of arm 101 preferably has a width slightly greater than that of the non-conducting segment to provide more exact control. In this case, when the system is in perfect synchronization, equal amounts of plus and minus signal are applied to capacitor 103 so that they cancel out.

If the receiver deflection gets out of synchronization by more than one whole line, either plus or minus vertical synchronizing pulses are applied to the capacitor 94 depending upon whether the shaft 82 is rotating too fast or too slow. The resulting charge on capacitor 94 energizes relay coil 96 to pull its armatures 97 and 98 down to their lower positions, thus connecting the frequency control unit 107 to the capacitor 94. As a result, the motor 84 will either be speeded up or slowed down to bring the vertical deflection back into synchronization, without being disturbed by horizontal synchronizing signals.

As soon as vertical synchronization is reached, the relay armature 97 goes back to its upper position so that the horizontal synchronization control takes over.

It will be noted that ground was removed from lead 100 by the pull down of armature 98 while the system was being pulled into vertical synchronization. As previously mentioned, this is to prevent false acknowledgements from the aircraft. Ground was also applied to lead 361, to prevent loss of an acknowledgement message while its transmission is so prevented.

*The channel selection and address coding for pictorial transmission*

CHANNEL ACTIVATION AND SELECTION

Refer now to the lower half of Fig. 2 which shows the channel selection and address coding portion of the picture transmitter.

In the case of air traffic control, each aircraft approaching an airport will have one of the sixty-four channels assigned to it. This assignment may have been made before take-off or it may have been made over the regular radio communication system as the aircraft approached the airport.

Assume that a certain aircraft approaching the airport at which the transmitter is located has been assigned channel 52 and that the airborne receiver has been set to receive that channel. Assume that the controller at the airport wishes to give traffic or landing instructions to this aircraft. The controller then pushes the channel 52 activate button 111 which causes the following to happen:

(1) The address code for channel 52 is transmitted during picture lines 2, 3, and 4 (which is during the vertical return time) so that only the aircraft to which channel 52 is assigned will receive the picture. (Note Fig. 8.) As will be discussed later, the pilot has previously set a manual address selector on position for reception on channel 52.

(2) The gate 18 of channel 52 is opened at the start of the first complete picture frame (at the start of line 7) and remains open for the duration of said frame (until the end of line 80). Thus there will be transmitted any information or instructions that have been written up on the display board 13. See Fig. 5 for a sample of such information. A view of the bottom five acknowledgement lamps on panel 16 will also be transmitted for a reason discussed later. Coordination of the human controller with the synchronous running of the picture transmission system is necessary for efficient use of the system, but must not require excessive skill or dexterity on the part of the controller. To facilitate this coordination, it is convenient to divide the totality of synchronized frame intervals into two sequences A and B, each comprising alternate frame intervals. Transmissions of the two sequences are indistinguishable, the distinction lying entirely within the channel selecting mechanism. Striking an activate key during an A-sequence frame interval will result as described below in transmission of the desired picture during the next following B interval, and vice versa. This prevents transmission of partial or mutilated pictures, yet permits the controller to actuate any key at any time that the system is not yet committed to subsequent transmission.

The circuitry at the bottom of Fig. 2 will now be considered in detail. In the present example where there are sixty-four channels, there are sixty-four activate buttons corresponding to button 111. Each button has associated with it similar relay circuitry. Therefore, it will be sufficient to describe only that circuitry associated with the channel 52 activate button 111.

When the controller pushes or hits button 111 to activate channel 52, the switch arms 112, 113, and 114 make contact with the associated contact points. The circuit thus closed through switch arm 112 energizes a relay coil 116 which pulls down an armature 117 and a button lock-out mechanism indicated by the dotted lines 118. This will be discussed later.

The activate buttons 111 et cetera are spring biased so that a button returns to its original position after it is pushed down and released. In practice, the controller should hit an activate button as a typewritter key is hit so that it is held down for only a fraction of a second. If it is held down for over a second, the message will be transmitted twice. Also, if held down for a large fraction of a second, double transmission may occur. This does no harm except for the unnecessary time required for transmission.

Assume the button 111 has been hit at the time an arm 122 of a frame sequence selector commutator 123 is in the position shown, and is released before arm 122 moves over to the next conducting segment. A relay coil 119 is energized (before button 111 is released) by way of a connection to ground through the commutator 123, a lead 124, the switch arm 113, and a lead 120.

It will be seen that the commutator 123 has two conducting segments, each extending nearly 180 degrees around the commutator and that the grounded arm 122 is mounted on the shaft 64 for rotation therewith.

When coil 119 is energized, five relay armatures 127, 128, 129, 131, and 132 are pulled into contact with their associated contact points. In this position the armatures will be referred to as "closed." The armatures 129, 131, 132 are for address code transmission as will be described later.

Closing of armature 127 completes a holding circuit for relay coil 119. This circuit may be traced over a bus lead 133 to an arm 134 of a commutator 136 and through a conducting segment to ground.

Commutator 136 is referred to as the activator release commutator. It has a conducting segment extending the full 360 degrees except for an insulating segment at the top. There are two commutator arms, the arm 134 and an arm 137, diametrically opposed and insulated from each other. They are mounted on an arm of insulating material which is attached to the shaft 64 for rotation therewith.

Closing of armature 128 connects a gate pulse lead 138 to a bus lead 139, thence to a conducting segment 141 of a gate pulse generator commutator 140. The lead 138 will now be grounded as soon as a commutator arm 142 rotates into contact with segment 141. When this happens transmission over channel 52 can take place because the gate 18 is opened when ground is put on lead 138. The gate 18 may include an amplifier tube that has sufficient negative bias to bias it to cut-off, and that grounding the lead 138 will short out or otherwise remove the negative bias.

The gate pulse generator commutator 140 comprises two conducting segments, the segment 141 and a segment 143. These segments have an angular spacing and width such as to provide a gating pulse that opens the gate of the selected channel for the duration of a picture frame. The gating pulse preferably starts immediately following line six and lasts to the end of line eighty, in the present example, it being remembered that the vertical return time occupies the time of picture lines one to six, inclusive.

From the foregoing description it will be seen that no picture transmission results immediately if an activate button such as 111 is closed during the period of a picture frame as usually happens. Thus, in the example given, the button 111 was hit by the controller during a picture frame that will be called frame A. Transmission of only a part of this frame is not desired since transmission should be preceded by an address code.

Therefore, the arrangement is such that the activator circuit is set up during picture frame A in the example assumed, and transmission takes place during the next succeeding picture frame which is referred to as frame B. This transmission occurs when the gate pulse generator arm 142 rotates into contact with the segment 141.

Meanwhile, as the arm 122 of the frame sequence selector commutator 123 rotates into contact with its next conducting segment, the relay coil 121 cannot be closed by way of the bus lead 126 because the controller has already released button 111 and the switch arm 114 is in open position.

Meanwhile at the activator release commutator 136 the arm 137 has passed over the insulating segment at the top of the commutator but it has no effect since relay coil 121 has not been energized.

The B picture frame transmission will be completed as the arm 142 leaves segment 141 of the gate pulse generator commutator. At this time arm 134 of the activate release commutator reaches the insulating segment at the top of the commutator and the holding circuit of relay coil 119 is broken. The armatures of coil 119 then move back to their original open positions.

At this point the actuate button interlock action will be described. As soon as a button such as 111 is pushed down, the relay 116, 117 pulls down catch members 144 so that they are in front of stops 146 on the button shafts. Thus, no other activate buttons can be pushed down so long as relay coil 116 is energized.

Relay coil 116 is held energized by a locking circuit that may be traced through a lead 147, the conducting segment 148 of an interlock release commutator 149, and the commutator arm 151 to ground. The arm 151 is doubled-ended, both ends being connected to ground. It is mounted on the shaft 64 for rotation therewith. The segment 148 extends for slightly less than 180 degrees around the commutator so that the circuit to ground is broken momentarily when the arm 151 rotates into the vertical position.

By the time the arm 151 has reached the vertical position, the system has been set up for transmission of the succeeding B picture frame as previously described. At the vertical position the button interlock is released so that any other activate button may be pushed in for setting up some other channel for transmission during the next succeeding A frame.

In the foregoing description it was assumed that an activate button was hit during an A picture frame with the result that the following B picture frame was transmitted.

Similar circuit action takes place if an activate button is hit during a B picture frame. In that case the following A picture frame is transmitted. It will be apparent that in this instance it is the relay coil 121 that is energized, and that transmission takes place as the gate pulse commutator arm 142 wipes the segment 143.

If it happens that an activate button is held down while the frame sequence selector arm 122 makes contact with both segments of commutator 123 in succession, then both relay coil 119 and coil 121 will be energized and transmission of a single message will take place during two successive picture frames. This is objectionable only in that unnecessary transmission time is used.

ADDRESS CODE TRANSMISSION

In the foregoing discussion the address code transmission has been ignored. The circuit for transmitting an address code immediately preceding the transmission of a picture frame will now be described.

Figure 8:
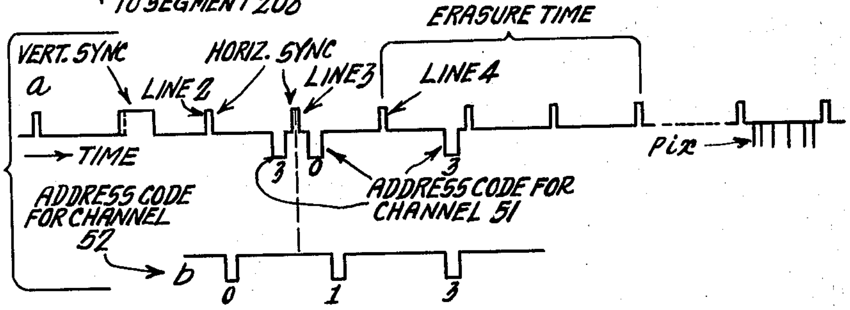
Fig. 8 is a group of graphs that illustrate the signal transmitted from the ground station to the aircraft.

The address code is a three pulse code in the present example. One pulse is transmitted during each of picture lines 2, 3, and 4. Each pulse may be transmitted during any one of four intervals of a scanning line, that is, a horizontal scanning line is divided into quarter intervals, and there is a pulse available for each interval. Two examples of such transmission are shown in Fig. 8.

Referring to Fig. 2, the address coder includes a pulse address generator or commutator 152 that has four conducting segments which are marked 0, 1, 2, and 3. An arm or brush 153 for the commutator 152 is mounted on the high-speed shaft 46 for rotation therewith. The arm 153 is connected to the negative terminal of a battery. Thus four code pulses that are identified as code pulses 0, 1, 2, and 3 are produced during each horizontal scanning line. As shown in Fig. 8, the code pulses have a polarity which is opposite that of the synchronizing pulses. It will be apparent that the arm 153 makes one rotation during each scanning line.

The four segments 0, 1, 2, and 3 of commutator 152 are connected to bus leads correspondingly marked 0, 1, 2, and 3. Therefore, any combination of the code pulses 0, 1, 2, and 3 may be taken off these bus leads by relay connections for the various channels.

In channel 52 the relay contact points associated with relay armatures 129, 131, and 132 are connected to bus leads 0, 1, and 3, respectively. Thus, in the case of relay coil 119 being energized, the code pulses 0, 1, and 3 are applied to three bus leads B1, B2, and B3, respectively. These bus leads are connected to three segments of a commutator 154.

The scanning line during which a particular code pulse is transmitted is determined by the commutator 154. It has two groups of three conducting segments each, the two groups being diametrically opposed and being marked A and B, respectively. An arm or brush 156 for commutator 154 is mounted on the low-speed shaft 64 for rotation therewith. The arm 156 is connected to the conductor 24 to supply address code pulses to the adder 21 for transmission.

As indicated on the drawing, the three segments of the group marked B are angularly positioned so that they are wiped by the arm 156 during scanning lines 2, 3, and 4. Thus, immediately preceding transmission of picture frame B there is transmission of a code pulse during line 2, of a code pulse during line 3, and of a code pulse during line 4.

In the example of the address coding given for channel 52, there is transmitted during lines 2, 3, and 4 the code pulses 0, 1, and 3, respectively. See graph *b* of Fig. 8. Only the aircraft with its address decoder set to receive on channel 52 will recognize this pulse code and receive the picture that is preceded by this address.

The three segments of the group marked A are also angularly positioned so that they are wiped by arm 156 during lines 2, 3, and 4, respectively. These are the lines of picture frame A. These segments are connected to bus leads A1, A2, and A3. These bus leads are connected to relay armatures 157, 158, and 159, corresponding to armatures 129, 131, and 132, but which are actuated by the relay coil 121. Therefore, if an actuate button such as 111 is hit during the B frame whereby relay coil 121 is energized to set up the circuit for transmission of the following A frame, the relay armatures 157, 158, and 159 will be in their closed position, the three A segments of commutator 154 will be connected to the bus leads 0, 1, 3, and the address code for channel 52 will be transmitted at the start of picture frame A. Thus immediately preceding the picture transmission over a particular channel, there is always transmission of the address code that is assigned to that particular channel.

*The address selection and address decoding for pictorial reception*

Refer now to the manual address selector and the address decoder of the aircraft receiver shown in Fig. 3.

The manual address selector includes three switches 161, 162, and 163 which, in practice, may be wafer type switches. Each switch comprises a switch arm, mounted on a shaft 166, and a plurality of switch points or conducting segments. There is one switch point for each channel, sixty-four in the present example. Only a few of these switch points or segments are shown, the presence of the remainder being indicated by dotted line.

A manually operable knob 164 is attached to the rotatable shaft 166 so that the aircraft pilot may rotate the switch arms of the switches 161, 162, and 163 for selecting any desired one of the sixty-four channels. In the example illustrated, the address selector switches have been set for reception on channel 52.

A four segment commutator 167 corresponding to the address pulse generator 152 (Fig. 2), is provided for sampling the received codes. The arm 168 of commutator 167 is mounted on the high-speed shaft 81 for rotation therewith so that it makes one rotation during each picture line. The arm 168 is connected to ground. The four commutator segments, which are marked 0, 1, 2, 3, since they correspond to the similarly marked segments of commutator 152 of Fig. 2, are connected to four bus leads also marked 0, 1, 2, and 3. Segment 0 is connected to bus lead 0, segment 1 to bus lead 1, et cetera.

The switch segments of selector switches 161, 162, and 163 are connected to the proper bus leads 0, 1, 2, and 3 for matching the address code of a particular channel. In the present example the switch segments of switches 161, 162, and 163 for selecting channel 52 are connected to the bus leads 0, 1, and 3 since the code 0, 1, 3, is the address code that is transmitted for channel 52.

For channel 51 the segment connections of switches 161, 162, and 163 are to bus leads 3, 0, 3 since the address code for channel 51 is 3, 0, 3. It will be apparent that the other switch segments of switches 161, 162, and 163 should be connected in a similar manner to the appropriate bus leads for matching the address codes of the various channels.

In operation, the manual selector switches 161, 162, and 163 and the four segment commutator 167 provide connection to ground at the proper time for address decoder relays 171, 172, and 173. The remainder of the decoding circuit will be described before describing the decoding operation.

The address decoder comprises a three-segment line selector commutator 174, the relays 171, 172, and 173 as well as the four segment sampling commutator 167 previously described.

The line selector commutator 174 has three conducting segments angularly positioned to correspond to horizontal scanning lines 2, 3, and 4 which are the lines during which the address code is transmitted. It also has a rotatable arm 176 that is mounted on the low-speed shaft 82. To avoid crowding the drawing and in order to simplify the circuit lay-out, the shaft 82 has been brought to the upper part of the drawing to avoid locating commutator 174 at the lower part of the drawing.

The received signal, which includes the address code, is supplied to the arm 176 of commutator 174 by way of a lead 177. The commutator segments corresponding to lines 2, 3, and 4 are connected to the lower terminals of the relay coils 178, 179, and 181, respectively, of the decoder relays. These upper terminals of these relay coils are connected through conductors 182, 183, and 184 to the switch arms of the selector switches 161, 162, and 163, respectively.

The relay coils 178, 179, and 181 will be energized successively as the commutator arm 176 wipes past the three segments of commutator 174 providing the circuit of each relay coil is completed to ground at the instant that a code pulse is received. This decoding operation will be discussed more fully after considering the rest of the decoder relay circuits.

Each of the decoder relays 171, 172, and 173 has associated with it a holding coil as indicated at 186, 187, and 188. Each decoder relay includes a pair of relay armatures that are pulled into contact with associated contact points when either the main relay coil or the holding coil is energized. The armatures are spring biased so that they move back to the open position when both coils are de-energized. The holding circuit armatures for relays 171, 172, and 173 are shown at 191, 193, and 196. The decoder circuit armatures proper are shown at 189, 192, and 194.

Whenever one of the main relay coils 178, 179, or 181 is energized, its associated holding circuit armature (one of the armatures 191, 193, 196) is pulled down to energize the holding coil. Taking relay 171, for example, if coil 178 is energized by a received code pulse, the armature 191 is pulled down and closes a holding circuit that may be traced as follows: from the positive terminal of current source (not shown), through coil 186, armature 191, and its associated contact 197, a conductor 198 to the conducting segment 199 of a relay release commutator 201, and through the arm 202 of the commutator to ground. The same relay hold-down action takes place at relays 172, and 173 when their coils 179 and 181 are energized.

From the foregoing it will be seen that if relays 171, 172, and 173 are actuated successively by the three address code pulses received during lines 2, 3, and 4, the relay armatures 189, 192, and 194 will be pulled down thereby putting ground on a conductor 203. The conductor 203 is connected to the arm 204 of a commutator 206 which controls erasing and writing at the storage tube 33, and which also controls an automatic acknowledgement discussed hereinafter.

The erase-write commutator 206 has three conducting segments 207, 208, 209 which are angularly positioned to be wiped by the arm 204 during scanning line 1, during lines 4, 5, and 6, and during the remaining lines 7 to 80, inclusive. The arm 204 is mounted on the low-speed shaft 82 for rotation therewith, and therefore, makes one rotation during each picture frame.

When the address decoder is actuated by an address code so as to put ground on the conductor 203, the result is that, by way of segment 208 of commutator 206, ground is applied to the "erase" lead 37 to erase any picture previously stored on indicator tube 33 as described hereinafter. Next, ground is applied by way of segment 209 to the "write" lead 36 thereby opening the gate 32 so long as arm 204 is wiping the "write" segment 209. Thus, the gate 32 is held open for the duration of lines seven to eighty of a picture frame, and the picture is written on the screen 34 of the storage tube.

At the end of a picture frame transmission the arm 204 leaves the "write" segment 209 and engages the acknowledgement segment 207. This puts ground on a lead 211 to cause transmission of an automatic acknowledgement to be discussed later.

As the arm 204 leaves the acknowledgement segment 207, the arm 202 of the relay release commutator 201 moves to the break in segment 199 whereby ground is removed from lead 198 and the holding circuits of relays 171, 172, and 173 are broken. Since the address code to which the address selector is set is not being transmitted at this time, the relay armatures 189, 192, and 194 move back to their open position to remove ground from the commutator arm 204.

As the commutator arm 204 rotates further into contact with the erase segment 208, there is no erasure since the ground connection to the arm 204 has just been broken. Therefore, the picture that was written on the storage tube screen 34 remains there.

Assume now that after a few minutes another message is to be transmitted over channel 52 which, of course, is to be written on the screen 34. It is evident that the old message should be erased. Since ground was taken off the commutator arm 204 at the end of the first message transmission, the arm 204 has been rotating with the shaft 82 without having any effect, the gate 32 has been closed, and the message has remained on the screen 34.

Now, at the ground transmitter, channel 52 is again activated for transmission of a new message that has been written up on the display panel 13 (Fig. 2). The address code pulses for channel 52 are transmitted during picture lines 2, 3, and 4, and the address decoder relays are actuated to put ground on the commutator arm 204. Note that by the time the line 4 transmission interval is reached, the arm 204 is in contact with the erase segment 208. Thus the "erase" conductor 37 is connected to ground for the duration of lines 5 and 6, and depending upon the address code, possibly for a portion of line 4. Therefore, the old picture is erased and the storage tube is ready to receive a new picture. The reason why grounding the erase lead 37 erases the picture will be explained hereinafter in connection with a discussion of the storage tube.

When the arm 204 engages the "write" segment 209, the gate 32 is again opened and the new picture is written on the screen 34 as the arm 204 wipes the segment 209. Again, at the end of an automatic acknowledgement, the relay release commutator arm 202 reaches the insulating segment to break the relay holding circuit and take ground off the commutator arm 204.

In the preceding description the address decoder operation has been described generally but the circuits through which the address decoder relay coils 178, 179, and 181 are energized by the code pulses have not been traced through. This will now be done.

Assume the address code for channel 52 is transmitted from the ground station (Fig. 2). This code is three pulses identified as 0, 1, and 3. This means that the first code pulse is transmitted during the first quarter of picture line 2, the second code pulse is transmitted during the second quarter of line 3, and the third code pulse is transmitted during the fourth quarter of line 4. See graph *b*, Fig. 8.

Consider now the action at the address decoder (Fig. 3) when the manual address selector is set to receive on channel 52 as illustrated.

Throughout the duration of line 2, the arm 176 of the line selector commutator 174 is on the first segment corresponding to line 2. Thus, the code pulse 0 received during the first quarter of line 2 passes through relay coil 178, the conductor 182, and the arm and segment of selector switch 161 to the bus lead 0. It passes through bus lead 0 and through a conductor 210 to the 0 segment of commutator 167. At this time, since transmitter and receiver are synchronized, the arm 168 will be on the segment 0, thus completing the circuit to ground. Therefore, relay coil 178 is energized by the code pulse 0, and armature 189 is pulled down and held down by the holding circuit.

Throughout line 3, the arm 176 of communtator 174 is on the second segment corresponding to line 3. Thus the code pulse 1 received during the second quarter of line 3 passes through the relay coil 179, the conductor 183, and the arm and segment of selector switch 162 to the bus lead 1. It passes through bus lead 1 and through a conductor 212 to the one segment of commutator 167. At this time the arm 168 is on the segment 1, thus completing the circuit to ground. Therefore, relay coil 179 is energized and relay armature 192 is pulled down and held down by the holding circuit.

Throughout line 4, the arm 176 of commutator 174 is on the third segment corresponding to line 4. Thus the code pulse 3 received during the last quarter of line 4 passes through the relay coil 181, the conductor 184, and the arm and segment of selector switch 163 to the bus lead 3. It passes through bus lead 3 and through a conductor to the segment 3 of commutator 167. At this time the arm 168 is on the segment 3, thus completing the circuit to ground. Therefore, relay coil 181 is energized and relay armature 194 is pulled down and held down by the holding circuit.

From the foregoing, it is seen that reception of the channel 52 address code 0, 1, 3 has caused the three relay armatures 189, 192, and 194 to go to their closed positions thereby connecting the conductor 203 and commutator arm 204 to ground. This has occurred by virtue of the connections set up by means of selector switches 161, 162, and 163. The results of this ground connection have been previously discussed. The main result, of course, is that an old message display is erased and the gate 32 is opened so that a new picture frame is written as received on the storage tube screen 34.

*The cathode ray indicator tube*

Figure 6:
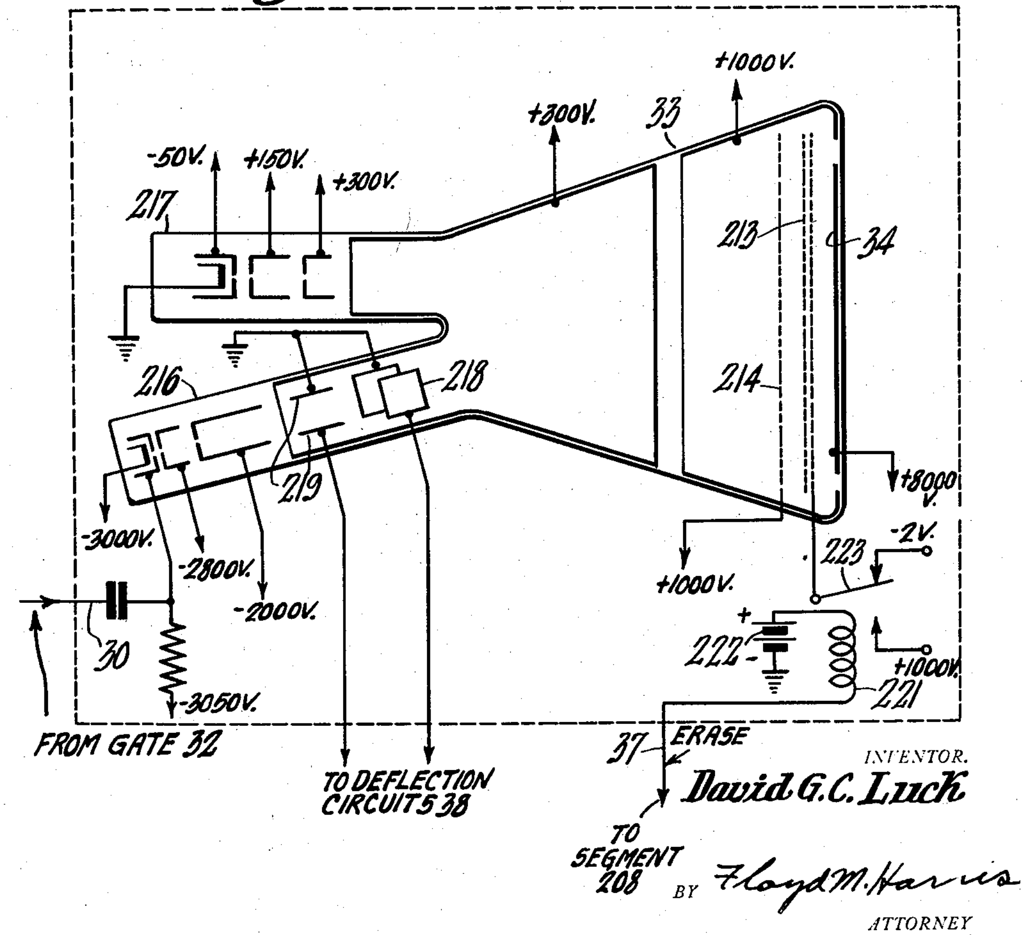
Fig. 6 is a view illustrating a direct viewing storage tube that may be employed as the viewing tube in the aircraft equipment.

The indicator or viewing tube 33 of the aircraft equipment (Fig. 3) preferably is of the direct viewing storage tube type shown in Fig. 6. The tube shown in Fig. 6 is described and claimed in application, Serial No. 295,768, filed June 26, 1952, in the name of Max Knoll, entitled "Picture Storage Tube," now Patent No. 2,856,559 issued October 14, 1958. Said application is a continuation-in-part of application, Serial No. 254,999, filed November 6, 1951, now abandoned.

Referring to Fig. 6, the tube 33 comprises an evacuated envelope in which there is a fluorescent screen 34. An aperture-mask control grid 213 is positioned in front of and adjacent to the fluorescent screen 34. Grid 213 consists of a very thin metal-backed layer of highly insulating material. The grid 213 is pierced by a large number, such as one hundred or more, of uniform and uniformly arrayed holes per linear inch. A collector grid 214 comprising a fine open-mesh metal screen is positioned in front of the grid 213.

An electron gun is located in the neck 216 of the envelope for producing a high-voltage picture-writing electron beam directed at and focused on screen 213. The beam will charge the areas of the insulating surface of screen 213 by a secondary emission action. This beam is modulated by video signals that are applied over a lead 30 to the control grid of the gun. The writing beam is made to scan the grid 213 by means of horizontal and vertical sawtooth deflecting waves applied to the horizontal and vertical deflecting plates 218 and 219. The modulated writing beam writes a received picture as a charge pattern on the insulating surface of the grid 213, and the local charge left around each grid hole determines whether electrons from a viewing electron spray beam will get through that hole or not.

The electron gun for providing the view or spray beam is located in a neck 217 of the envelope. This gun provides a broad uniform spray of electrons which fall perpendicularly toward the fluorescent screen 34 to excite it for viewing. The spray electrons are accelerated by the grid 214 and pass on through certain holes in the grid 213 to the fluorescent screen 34 if the charge pattern at said certain holes permits this. Thus there appears on the screen 34 a picture corresponding to the charge pattern written on the screen 213. The charge pattern on screen 213 and the corresponding picture on the fluorescent screen 34 will persist for a substantial time such as two or more minutes.

An electron lens or focusing raster is provided so that the view beam electrons passing through the storage screen 213 are brought to points of focus on the fluorescent screen 34. This provides an optimum resolution of the picture formed on the fluorescent screen. By providing appropriate spacing between fluorescent screen 34 and storage screen 213, as well as an appropriate field strength on both sides of the screen 213, there is formed an electron lens adjacent each aperture of the screen 213 which focuses the electrons passing through the aperture to a limited spot on the fluorescent screen.

In operation, the electron spray gun continuously provides a spray of electrons. The writing beam gun is normally biased to beam cut-off but is in condition to produce the writing beam at any instant. The deflection voltages are present continuously to cause the writing beam to scan the aperture-mask grid 213. When one frame of video signals is supplied from gate 37 over lead 30 to modulate the writing beam, a picture is written on the screen 34 which will persist for several minutes, for example, after this frame of video signals.

It will be noted that in the circuit arrangement illustrated, the writing beam gun is unblocked by the positive swings of the picture signal itself. This produces the writing beam modulation in the example illustrated where picture halftones are not involved. It may be desirable to add a clamping circuit to the control grid circuit of the writing beam gun. This may consist of a diode connected across the control grid resistor, with the diode cathode connected to the grid end of the resistor. When a clamping diode is employed as described, the gride resistor should have a high resistance such as two or three megohms.

If preferred, the gating of the picture signal may be done entirely at the grid circuit of the writing beam gun, the gate or amplifier 32 being open at all times to pass signal. In that case the unblocking pulse supplied over the "write" lead 36 (Fig. 3) may actuate a relay which connects the grid resistor of the writing beam gun to a bias voltage of lower value to unblock the writing beam. The unblocked beam will then be modulated by the picture signals applied over lead 30.

This picture may be erased rapidly, however, to permit transmission and reception of a new passage. As indicated in Fig. 3, picture lines 4, 5, and 6 have been assigned for erasure time in the specific example described. This is indicated specifically at commutator 206 which includes the erasing segment 208. If commutator arm 204 is grounded when it wipes segment 208, the picture on tube 33 is erased.

Fig. 6 shows how the erasing may be done. Grounding of commutator segment 208 completes a circuit through the lead 37, a relay coil 221 and a battery 222. This pulls down a relay armature 223 which is normally held in the "up" position by spring biasing.

When armature 223 is pulled down, it connects the aperture-mask screen 213 to the same voltage as that of the collector grid 214, i.e., to plus 1000 volts in the example shown. Spray electrons then fall on the entire surface of the insulating layer of screen grid 213 and erase the charge pattern.

Figure 7:
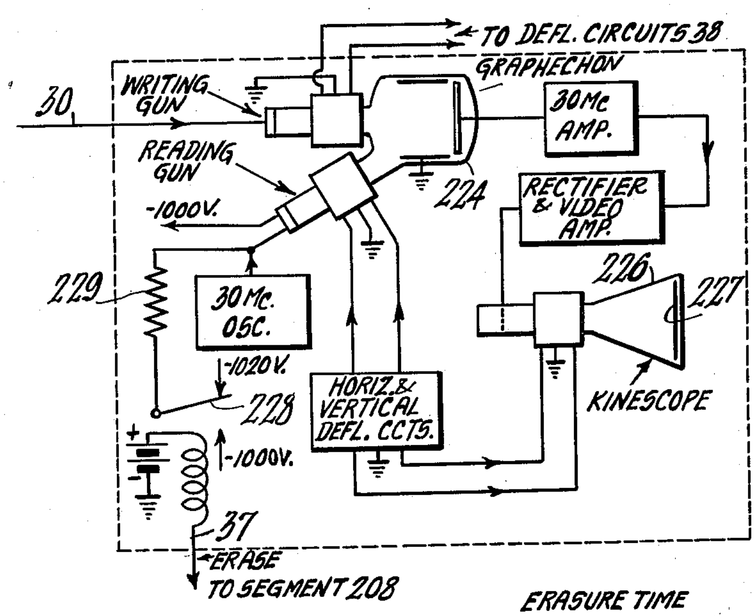
Fig. 7 is a circuit and block diagram of a storage tube and viewing tube combination that may be employed in the aircraft equipment in place of the tube shown in Fig. 6.

Fig. 7 shows, by way of example, an indicator tube arrangement that may be used in place of the direct viewing storage tube shown in Fig. 6. In this example a graphechon storage tube 224 is employed to store the video signal. A reading beam scans the storage screen to take off the stored video signal a little at a time and supply it to a kinescope 226 having a fluorescent screen 227 on which the picture appears.

An arrangement of the type shown in Fig. 7 is described in an article by L. Pensak, entitled "The Graphechon—a Picture Storage Tube," published in the RCA Review for March 1949. In the present arrangement shown in Fig. 7 there is no conversion from one type of scan to another, both the writing scan and the reading scan being of the usual television type. The reading scan, however, is much faster than the occasional writing scan so as to avoid flicker at the kinescope. The reading scan may be at the rate of sixty or more frames per second.

It will be noted that a 30 m.c. modulation is put on the reading beam so that the reading output signal can be supplied to the kinescope to the exclusion of any signal produced by the writing beam.

Any picture stored on the graphechon may be erased quickly by increasing the reading beam current. In the example illustrated, this is done when the lead 37 is grounded by way of commutator segment 208 (Fig. 3). This energizes a relay coil to pull down an armature 228 and connect it to the same voltage as that on the cathode of the reading gun, i.e., to minus 1000 volts in the example shown.

The armature 228 normally connects minus 1020 volts to the control grid of the reading gun through a grid resistor 229. Therefore, the reading beam current normally is small enough so that it may scan the storage screen for one or more minutes before erasing the charge pattern from the screen. When the beam current is increased for erasure, on the other hand, the charge pattern will be erased in one or two scans, for example, of the storage screen. To insure good erasure under all conditions, it may be desirable to make the rate of the kinescope and reading beam scanning greater than sixty frames per second so as to provide at least three erasure scans during the allotted erasure period.

ACKNOWLEDGMENT CODE TRANSMISSION AND RECEPTION

Figure 4:
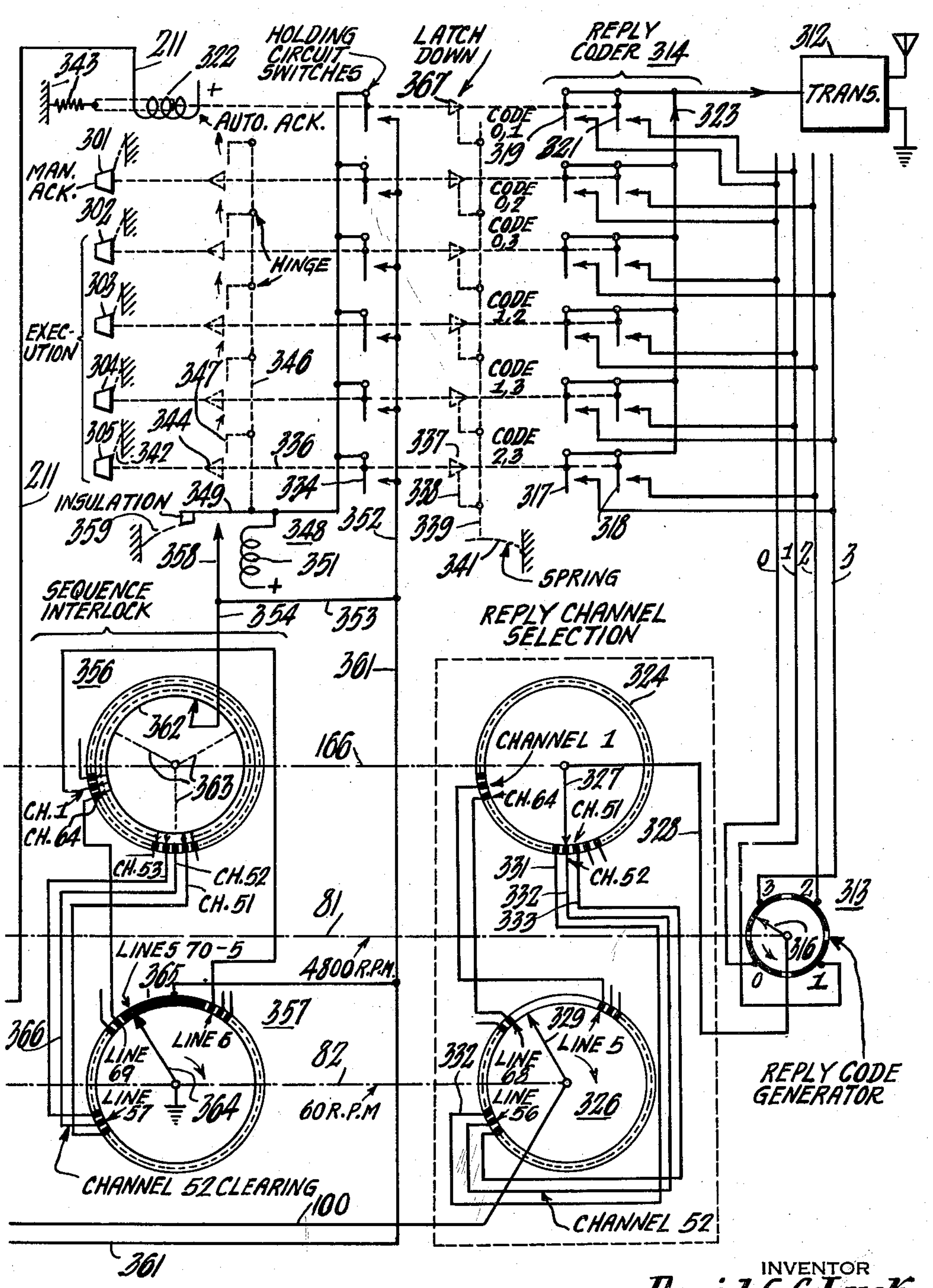
Fig. 4 is a circuit and block diagram of the remaining portion of said aircraft equipment.

The aircraft equipment includes a reply code transmitter which is shown in Fig. 4. By pushing the manual acknowledgment button 301, the pilot may manually acknowledge that he has received and seen a pictorial message. By pushing one or more of the acknowledgment buttons 302, 303, 304, and 305 he may advise that he has executed the instructions of a particular portion of a pictorial message.

When an acknowledgment button is pushed, a code is set up. This code is transmitted during the occurrence, on any picture frame, of a particular horizontal scanning line period that has been assigned to the particular communication channel being used by this aircraft. In the example that has been assumed, the aircraft is operating on channel 52; the horizontal line period assigned to this channel for reply is line 56. Aircraft do not reply during ground transmission of address codes, on lines 2, 3, and 4.

At the ground station, as shown in Fig. 1, there is a reply code receiver that includes a radio receiver 306 for receiving the reply code and a reply decoder 307. Also, as shown in Fig. 2 (upper left-hand corner), each channel includes an acknowledgement request unit together with an acknowledgement lamp panel. The acknowledgement request unit and the lamp panel for channel 52 are shown at 308 and 16, respectively. For channel 51 they are shown at 309 and 14, respectively. Since the arrangement for each of the sixty-four channels is similar, it is not necessary to illustrate the additional channels.

Before considering the circuit details of the reply code transmitter and the reply code receiver, the general operation will be described briefly.

Assume, for example, that the airport controller desires manual acknowledgement by the pilot of a pictorial message that is to be transmitted to him. The controller pushes request button 311 (Fig. 2) which causes lamp M to light up and remain lighted until a mannual acknowledgement reply code is received. A view of the lamp M is transmitted along with the pictorial message. The pilot, seeing the lighted lamp M in the received picture (see Fig. 5), replies by pushing acknowledgement button 301 (Fig. 4).

The result is transmission of the manual acknowledgement code during picture line 56.

At the ground station (Fig. 1) the manual acknowledgement code is received and applied to the reply decoder 307. This particular code opens a circuit that previously was connected to ground to keep the lamp M lit. This circuit will be discussed later. Thus the lamp M is extinguished and the controller, by glancing at the panel 16, can see that the pilot has acknowledged that he has received and seen the message. On a subsequent retransmission to renew the airborne display, the pilot can see that his acknowledgement has taken effect.

*The reply code transmitter (Fig. 4)*

The reply code transmitter of each aircraft comprises a radio transmitter 312 (Fig. 4), a reply code generator commutator 313, and a group of switches comprising a reply coder 314. The transmitter 312 operates on a different carrier frequency than the picture transmitter 26.

The code generator 313 has four conducting segments which are marked 0, 1, 2, and 3 corresponding to the code pulses generated as the commutator arm 316 wipes the segments. The arm 316 is attached to the high-speed shaft 81 so that it is rotated once per picture line. Thus four code pulses 0, 1, 2, and 3 are produced successively during each picture line.

The segments of commutator 313 are connected to bus leads that are correspondingly marked 0, 1, 2, and 3.

The reply coder 314 comprises six double arm switches. Each switch arm has a contact point connected to the correct bus lead from the reply code generator 313 for transmitting the desired code. For example, the bottom two switch arms 317 and 318, which are closed when button 305 is pushed, are connected to bus leads 2 and 3. Thus when button 305 is pushed, the two code pulses 2 and 3 are transmitted when picture line 56 (assigned to channel 52) occurs.

The upper pair of switch arms 319 and 321 of the reply coder 314 are actuated by a relay coil 322 when it is energized for automatic acknowledgement. The remaining five pairs of switch arms (below the arms 319 and 321) are actuated by the acknowledgement buttons 301, 302, 303, 304, and 305, respectively.

Suitable latch-down and interlock means are provided for the reply coder. Before describing these, however, the reply code transmission circuit will be described more completely.

Assume that button 305 is pushed down and released by the pilot to advise the airport controller that he (the pilot) has executed certain instructions. The switch arms 317 and 318 are latched down by a mechanism described hereinafter so that they are held connected to bus leads 2 and 3. As a result, these two bus leads are connected to the radio transmitter 312 through a lead 323.

The code pulses 2 and 3 will now modulate the radio transmitter 312 if the arm 316 of the reply code commutator 313 is connected to ground and held at ground potential during one rotation of said arm 316. Since the aircraft is operating on channel 52 in the example given (to which picture line 56 is assigned), it is desired that the switch arm 316 be grounded during the occurrence of picture line 56.

This is accomplished by means of a reply channel selection arrangement that comprises a manual selection switch 324, which may be a wafer switch, and a channel selection commutator 326. The selection switch 324 comprises a conducting segment or switch point for each of the sixty-four channels, and further comprises a switch arm 327. The switch arm 327 is mounted on the manually rotatable shaft 166 so that it rotates therewith. The selection switch arm 327 is connected to the rotatable arm 316 of the code generator 313 through a lead 328. The selection switch 324 may be a duplicate of the switches 161, 162, and 163 shown in Fig. 3.

Viewing Figs. 3 and 4 together, it will be evident that when the pilot turns the address selector knob 164 (Fig. 3) to set the aircraft equipment for operation on the assigned channel, he also sets the selection switch arm 327 (Fig. 4) on a selected segment of selection switch 324.

The channel selection commutator 326 comprises a total of sixty-four conducting segments, one for each channel, which are angularly disposed to correspond to the picture lines assigned to the various channels. A rotatable arm 329 for this commutator is mounted on the low-speed shaft 82 so that arm 329 makes one rotation during each picture frame. Since the arm 329 is driven in synchronism with the received picture synchronizing pulses, it will always be in contact with a segment corresponding to a certain picture line. This same thing is true at all the other aircraft carrying like equipment. Specifically, for example, during the horizontal line 56, the arm 329 is in contact with the segment marked "line 56."

The conducting segments of channel selection commutator 326 are connected to the conducting segments, respectively, of the selection switch 324 by way of leads 331, 332, 333 et cetera. Note that the segment at commutator 326, corresponding to line 56, is connected by the conductor 332 to the channel 52 switch segment of selection switch 324. Similarly, each of the sixty-four switch segments or contact points of the channel selection switch 324 is connected to that segment of channel selection commutator 326 which corresponds to the picture line assigned to the particular channel.

Figure 9:
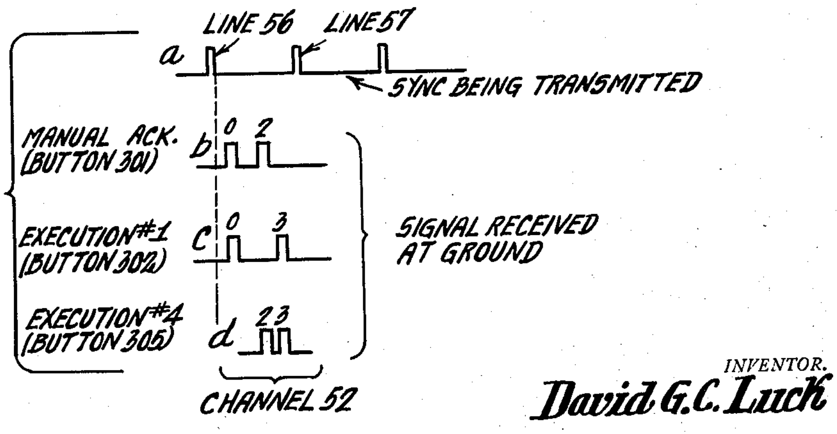
Fig. 9 is a group of graphs that are referred to in explaining the reply code transmission from the aircraft to the ground station.

It was previously assumed that the pilot has pushed down execution button 305 to advise execution of instructions that had been pictorially transmitted. It was explained that the code pulses 2 and 3 are generated and transmitted during and only during the period of the picture line assigned to channel 52 (i.e., during the line 56) because of the operation of the reply channel selection circuit. (See Fig. 9.) Now consider the operation of this circuit.

First it should be kept in mind that synchronizing pulses are being transmitted at all times from the ground station and that at the aircraft equipment the high-speed shaft 81 and the low-speed shaft 82 are being driven in synchronism with the corresponding shafts of the ground equipment. Thus, the complete system is always in condition for picture transmission and reception at any time and also is in condition for reply code transmission and reply code reception at any time.

Now, execution button 305 has been pushed, the code 2, 3, has been set up, and this code will be transmitted as soon as the rotating pulse generator arm 316 is grounded. It will be grounded during and only during the period of picture line 56 as will be seen by tracing through the circuit as follows: There is a circuit from arm 316 through lead 328, through switch arm 327 to the switch point for channel 52 and through the conductor 332 to the segment of commutator 326 corresponding to line 56. When the arm 329 of commutator 326 rotates into contact with the line 56 segment, the circuit is completed during picture line 56 by way of arm 329, through conductor 100 and through relay armatures 106 and 98 (Fig. 3) to ground. Thus, the reply code 2, 3 is transmitted during the picture line 56 assigned to channel 52. Other aircraft with the same equipment may transmit reply codes, during the other picture lines assigned to the channels on which they are operating. It is apparent that the reply code transmission is a time multiplex transmission in which the time multiplex periods are controlled by the picture synchronizing pulses. It should be understood that the time interval assigned to a multiplex channel is not necessarily one picture line; it may be two or more picture lines or, if preferred, a fraction of one picture line.

It may be noted that each reply code pulse is of substantial duration, preferably substantially a full quarter line in duration, so that the propagation time from an aircraft to the ground station will be immaterial at the comparatively low picture frame rate and horizontal line rate employed.

In tracing through the operation in the preceding paragraphs it was assumed that the relay armatures 106 and 98 were in their upper positions so as to put ground on the conductor 100. This is the condition when the system is in synchronism, as previously pointed out. If it falls out of synchronism, ground is taken off conductor 100 and there can be no transmission of a reply code. Thus, transmission of a false code is avoided.

LATCH-DOWN AND INTERLOCK MEANS (FIG. 4)

The latch-down and interlock arrangement for the switches actuated by reply code buttons 301 to 305 and by the relay coil 322 will now be described. Each of the buttons 301 to 305, as well as the automatic reply relay coil 322, has a shaft of insulating material (shown by broken line) in engagement with both the pair of reply code switch arms, such as 317 and 318, and a holding circuit switch arm such as switch arm 334. When a button is pushed down, or coil 322 energized, the three switch arms (317, 318, and 334 in the case of button 305) make contact with their contact points. When the button is released, or coil 322 de-energized, the pair of reply code switches remain closed but the holding circuit switch opens.

This result is obtained by causing the switch shaft to latch down, but not before the shaft returns a short distance from its bottom position. Consider the switch shaft 336, for example, which is actuated by the button 305. This shaft has a cone or wedge-shaped piece 337 secured to it. A stop member 338 rigidly secured to a slidable bar 339 engages the wedge piece 337. The slidable bar 339 is forced upward by a still spring 341. A similar arrangement is provided at each of the six switch shafts as shown.

When a switch shaft, such as 336 is pushed to its bottom position to close the three associated switches, the slidable arm 339 is forced down by the wedge piece which slides past the stop member 338, and said stop member 338 is forced back up by the spring 341. Thus the switch shaft is latched down, but allowed to move back enough to open the holding switch but not the pair of reply code switches.

If a different reply code button is pushed down later, or if coil 322 is energized for automatic reply, any switch shaft previously latched down is released. More specifically, moving any switch shaft to its bottom position, i.e., to its maximum position to the right, will unlatch any switch shaft previously latched down.

Each of the six switch shafts is spring biased so that it tends to return to its original position after it is pushed down. Such spring biasing is indicated as at 342 for the button actuated switch shafts, and is indicated at 343 for the automatic acknowledgement switch shaft.

The holding circuit and sequence interlock arrangement will now be described. The purpose of this arrangement is to insure that after one reply button has been pushed down, a second reply button cannot be pushed down until the reply code set up by the first button has been transmitted.

First it should be noted that on each switch shaft there is a cone or wedge-shaped member similar to those in the latch-down mechanism, but with the wedge sloping in the opposite direction. Such a wedge member is indicated at 344 on the shaft 336. Associated with each wedge member is a stop member that is hinge mounted on a slidable bar 346. At switch shaft 336 the stop member is indicated at 347. Each of the stop members such as 347 is hinged so that it may be swung upward but not downward from the position shown.

The position of the slidable bar 346 is determined by a holding relay 348, specifically by the position of the holding relay armature 349 which it engages. The coil 351 of the holding relay 348 is normally de-energized. If one of the buttons 301 to 305 is pushed down or if automatic acknowledgement coil 322 is energized, the holding relay coil 351 is energized and the armature 349 and the slidable bar 346 are pulled down. The result is to lock up all buttons that have not been pushed down.

Assume that reply button 305 is pushed down and released by the pilot. This causes the switch arm 334 to make momentary contact with its contact point as previously described. This energizes the relay coil 351 (through a circuit traced below) to pull the stop members corresponding to 347 in front of the wedge members on all the button shafts not pushed down. Thus all reply buttons, except the one pushed down, are locked up and will remain locked up until the holding relay 348 is de-energized.

The circuit through which coil 351 is energized when button 305 is pushed down may be traced from the positive terminal of a current source (not shown) through coil 351, through switch arm 334 and its contact point to a conductor 352, through a conductor 353 and a conductor 354 to a wafer type switch 356, and through a commutator type switch 357 to ground and thus to the negative terminal of said current source. As to the completion of the circuit through switches 356 and 357, it will be apparent from the later detailed description of these switches that except for a short time interval there is always a connection through them to ground. Thus a button such as 305 need be held down only a small fraction of a second to insure that the holding relay coil 351 is energized.

As soon as holding relay coil 351 is energized and armature 349 pulled down, the armature 349 makes contact with an associated contact point to complete a holding circuit through a conductor 358, and through the switches 356 and 357. It is apparent that normally the holding relay 348 is released when the circuit through switches 356 and 357 is broken, whereby the slidable bar 346 is driven upward by a spring 359 to unlock the reply buttons. Before describing the construction and operation of the switches 356 and 357, it should be noted that extending from the conductor 352 there is an additional holding circuit conductor 361 which is effective only if the system drops out of synchronism.

As to this additional holding circuit, reference to Fig. 3 will show that conductor 361 extends to the lower contact points of relay armatures 106 and 98. If the system is in synchronism, the lead 361 is not grounded and is ineffective. If the system falls out of either horizontal or vertical synchronism, either armature 106 or armature 98 will be pulled down, thereby grounding conductor 361. Now there is a holding circuit for the holding relay 348 (Fig. 4) which will not be broken until the system is pulled back into synchronism. The result is that the reply buttons that were locked up stay locked up until the desired reply code can be and is correctly transmitted.

Refer now to the switches 356 and 357. The switch 356 may be of the wafer type and is shown as comprising sixty-four conducting segments or contact points, one for each channel. Instead of a rotatable switch arm that makes contact with one conducting segment at a time, there is a rotatable switch arm mechanism that makes contact with all conducting segments but one. This switch arm mechanism comprises a conducting ring 362 that is mounted on the shaft 166 as indicated by the radial broken lines 363. The ring 362 carries contact points for all conducting segments but one. Note that with the switch 356 in the position shown (set for reception on channel 52) there is no contact point on the channel 52 segment. It is now evident that the holding circuit conductor 354 is connected to all but one of the conducting segments of switch 356.

The commutator switch 357 is similar to the commutator 326 except that the switch arm 364 carries a contact point of the shorting type so that it is always in contact with one of the conducting segments. As indicated, the conducting segments are angularly positioned to correspond to the picture lines assigned to the different channels, there being one segment for each channel. It will be understood that when arm 329 of commutator 326 is on its line 6 segment, for example, the arm 364 of commutator switch 356 is likewise on its line 6 segment. Individual conducting segments of the switch 357 are connected to individual conducting segments of the switch 356 as shown. For example, the switch segment of switch 356 for channel 52 is connected by a conductor 366 to the picture line segment 57 of switch 357 since segment 57 is utilized for clearing the sequence interlock following transmission on channel 52, i.e., following transmission during line 56. Only part of the segments and part of the connections are shown in order to simplify the drawing.

The commutator switch 357 also comprises a long conducting segment 365 that is angularly positioned to correspond to lines 70 through 5 or, more specifically, lines 70 to 80 and lines 1 to 5. Segment 365 is connected through a lead 370 to the lead 361 whereby a circuit for energizing relay coil 351 may be completed through the segment 365. It will be evident that there is always a connection from the lead 352 to ground for energizing coil 351 either by way of switches 356 and 357, or by way of leads 361 and 370 and switch 357, except for the short selected interval for clearing the sequence interlock. This short selected interval is, of course, the interval that arm 364 of switch 357 is on a segment connected to an open segment of switch 356 and on that segment only.

Consider now the effect of switches 356 and 357. As before, it is assumed that the pilot has turned address selector knob 164 (Fig. 3) to set the aircraft equipment for operation on channel 52 as illustrated. Again it is assumed that he has received a pictorial message, has executed the instructions, and has pushed reply button 305 (Fig. 4) to advise the controller that he has executed the instructions. The button 305 has been latched down, and the remaining buttons have been locked up and are being held locked up by means of the holding circuit through the switches 356 and 357.

The arms of commutator switches 326 and 357 are meanwhile being rotated by the low-speed shaft 82. When the arm 329 of commutator 326 makes contact with the segment for picture line 56, the reply code is transmitted as previously described. Meanwhile, the holding circuit connection through switches 356 and 357 has remained closed.

However, as soon as the rotating arms 329 and 364 leave their line 56 segments, the arm 364 is momentarily positioned on the next segment (line 57 segment) which is connected to the channel 52 segment of switch 356. This channel 52 segment is not connected to the ring 362, the switches having been set for reception on channel 52 as shown. The result is that the holding circuit is broken, relay 348 is de-energized, and the reply buttons are unlocked.

The button that was pushed down remains down, in the example illustrated, until another reply button is pushed down or the automatic acknowledgement coil 322 is energized. Therefore, the reply code is transmitted repeatedly until another reply code is to be transmitted. This repeated transmission is not necessary. If desired, the reply button mechanism may be arranged so that the reply button that was pushed down is moved back to its original position immediately after transmission of the reply code.

It has previously been pointed out that after reception of a pictorial message at an aircraft, there should always be an automatic acknowledgement to show the controller that the system is operating properly. Viewing Figs. 3 and 4 together, it will be recalled that if the aircraft equipment has been set for operation on a certain channel and the address code of this channel is received at the aircraft, then ground is put on arm 204 of commutator 206 (Fig. 3). When arm 204 comes into contact with segment 207, ground is put on lead 211, automatic acknowledgement relay coil 322 (Fig. 4) is energized to pull the switch shaft to the right where it is latched down for transmission of the automatic acknowledgement reply code. In the present example this code consists of the two pulses 0 and 1.

It should be noted that when coil 322 is energized, any reply button that is latched down is unlatched and returned to its original position. This is accomplished as a result of the wedge member 367 driving down the slidable bar 339 to unlatch any button that is latched down.

When a button is thus unlatched and driven back by the button return spring, the holding circuit of relay 348 is not broken since the hinged stop member, such as 347, swings upward as the associated wedge slides past it. Assume that it is the reply button 305 that had been pushed down and is now unlatched by the stop 338 being shoved down. The spring 342 drives the button 305 and switch shaft 336 to the left. The wedge member 344 as it moves to the left swings the stop 347 upward without moving the slidable bar 346.

After the automatic acknowledgement transmission, any one of the buttons 301 to 305 may be pushed down by the pilot for transmitting the desired reply code. It is apparent that the pilot may push a button for acknowledgement at any convenient time, and that the time multiplex control causes the actual reply code transmission to occur at the proper time, specifically, during the time of an assigned picture line. Any aircraft may reply during any frame, whether or not it has received a message during that frame.

*Reply code receiver, decoder, etc. of ground equipment*

Fig. 1 shows the ground equipment for receiving and decoding the reply codes transmitted by the various aircraft operating on the several channels assigned to them. Associated with this equipment of Fig. 1 is the apparatus of Fig. 2, particularly the acknowledgement request units and acknowledgement lamp panels shown in the upper left hand corner of Fig. 2.

Referring to Fig. 1, the reply codes are received by the radio receiver 306 and supplied over a conductor 371 to the reply decoder 307.

The reply decoder 307 comprises a code sampling commutator 372 having four conducting segments marked 0, 1, 2, and 3 to correspond to similarly identified reply code pulses. A rotatable arm or brush 373 for commutator 372 is mounted on the high-speed shaft 46 for rotation therewith. The code sampling commutator 372 is similar to the reply code generator commutator 313 (Fig. 4) except that preferably its segments are shorter than the generator segments to provide some tolerance in operation. The arm 373 of the sampling commutator, like the arm 316 of code generator 313, rotates once each picture line. If the apparatus is in synchronism, these two arms 373 and 316 rotate in synchronism.

The conducting segments 0, 1, 2, and 3 of sampling commutator 372 are connected to relay coils R0, R1, R2, and R3, respectively. Each relay coil, when energized, pulls down a bank of relay armatures shown above the relay coil. The bottom armature of each bank is for closing a holding circuit to energize a holding coil to keep the bank of armatures pulled down until the holding circuit is broken. These holding circuit armatures are shown at A0, A1, A2, and A3. The holding coils are shown at H0, H1, H2, and H3.

Assume, for example, that the reply code pulses 2, 3, are received as a result of the pilot pushing reply button 305 (Fig. 4). Since the ground and air equipment are in synchronism, as they must be in order to permit reply transmission, the pulse 2 will arrive while commutator arm 373 is on segment 2 whereby the pulse 2 from receiver 306 will pass through arm 373, the segment 2, a conductor 374 and through the relay coil R2 to energize it and pull down its bank of associated relay armatures. They are held down by the holding coil H2 which is energized by a circuit that may be traced from a current source (not shown) through coil H2, armature A2 and its contact point, a conductor 376 and a conductor 377 to the conducting segment of a holding circuit commutator 378. The holding circuit is completed from this conducting segment through a rotatable commutator arm 379 to ground and the other terminal of said current source.

The holding circuit commutator 378 is for breaking the decoder relay circuits at the end of each picture line to return them to condition for decoding. The conducting segment of commutator 378 extends for nearly 360 degrees, but there is a short insulating segment as shown at the top of the commutator to break the holding circuit when the arm 379 reaches it. The arm 379 is rotated once each picture line by the high-speed shaft 46. The shaft 46 is shown in two sections at right angles on the drawing merely as a diagrammatic showing to simplify the circuit layout of the drawing.

It was assumed above that the code pulse 2 of the code 2, 3, was received and that the relay R2 was energized to pull down its bank of armatures, and that said armatures were held down by the holding circuit.

Next the code pulse 3 is received while the sampling commutator arm 273 is on the segment 3. This code pulse passes through conductor 381 and energizes relay coil R3 to pull down its bank of armatures. They are held down by the associated holding circuit as previously described. The result is that, as a result of the simultaneous opening of contacts 383 and 384, while contacts 386 and 387 both remain open, ground is taken off the conductor 2–3 and the bus lead 382 to which it is connected. Corresponding leads 0–1, 0–2, 0–3, 1–2, and 1–3 and the bus leads to which they are connected remain connected to ground through the relay armature circuits. As will be discussed later, taking ground off the bus 382 at the end of a channel 52 transmission, which occurs during picture line 56, extinguishes the bottom lamp of panel 16 (Fig. 2) for the case assumed.

The relay armature connections of the reply decoder 307 will now be considered in more detail. First it should be noted that the six leads 0–1 to 2–3 from the decoder correspond to the automatic acknowledgement relay 322 and the five reply buttons 301 to 305, respectively, of Fig. 4. These six leads are connected to six bus leads as shown. Each of the six leads normally is grounded by way of two relay armatures, and has ground taken off it only when the correct pair of code pulses and only that pair is received.

Consider the lead 2–3 for example. It is connected to the upper contact points for the relay armatures 383 and 384 of relays R2 and R3, respectively. All relay armatures of the decoder are spring biased to the upper position. All armatures associated with the leads 0–1 to 2–3 are connected to ground. Thus, in the absence of received code pulses the lead 2–3 is connected to ground through both armature 383 and armature 384.

The lead 2–3 is also connected to the lower contact points for the relay armatures 386 and 387 of relays R0 and R1, respectively. This provides a safe code action since code pulses 0 and 1 will put a ground on lead 2–3. Only reception of the two code pulses 2 and 3 alone will take ground off lead 2–3 for extinguishing the corresponding panel lamp at the panel 16 (Fig. 2).

The relay armature connections for the other leads 0–1, 0–2, et cetera are connected in a similar manner for taking ground off a particular lead in response to reception of a particular code. The lead 0–1, for example, is connected to the upper contact points of the two armatures 388 and 389 actuated by relays R0 and R1, respectively. It is connected to the lower contact points of the armatures 391 and 392 actuated by relays R2, and R3, respectively. It is evident that reception of code pulses 0 and 1 will take ground off the lead 0–1.

In a similar manner, the relay armature connections for leads 0–2, 0–3, 1–2 and 1–3 are such that the code pulse pairs 0 and 2, 0 and 3, 1 and 2, 1 and 3 will remove ground from the respective leads.

The particular decoder 307 illustrated in Fig. 1 is shown merely by way of example. This particular decoder arrangement with a stack of several armatures for each relay coil is illustrated because it simplifies the drawing and makes the description of the operation easier to follow. In practice, if mechanical relays are employed, it might be preferable to avoid stacking so many relay armatures. This can be avoided by providing a separate relay coil and an associated holding circuit for each relay armature if desired. Thus, each relay coil such as coil R3 might be replaced by eight series connected or parallel connected relay coils, one for each of the stacked armatures illustrated.

CODE ERROR INDICATION

It is desirable that a warning be given if incorrect codes are received. This is done by use of error warning lamps, such as the top lamps on the lamp panels, such as panel 16 (Fig. 2). The circuit for each error lamp is such that the lamp will be lighted when ground is put on an error bus 393 (Fig. 1) during the line transmission time assigned to the channel with which that lamp is associated.

At the top of the bank of relay armatures for relays R0, R1, R2, and R3 are four armatures with associated lower contact points that are series connected to put ground on a lead 394 if four code pulses, instead of only two, are received. This will light the error lamp.

In order to light the error lamp if only one code pulse is received or if three code pulses are received, the group of relay armatures immediately above the lead 0–1 is employed. These armatures are indicated at E1, E2, E3, E4, E5, and E6. The armature E6 is connected to a lead 396 which is grounded through the armature connections by reception of either a single code pulse or a group of three code pulses. Normally the lead 396 is ungrounded.

To avoid an error indication when the first pulse of a pair of pulses is received, a commutator 397 is provided which has an arm 398 mounted on the high-speed shaft 46. A short conducting segment 399 is angularly positioned so that it is wiped by the arm 398 only during the last quarter of a picture line, and only after there has been time for reception of the code pulse 3 if it is being transmitted.

The lead 396 is connected to segment 399, and commutator arm 398 is connected through a lead 401 to the error bus 393. It is apparent that the first of a pair of received code pulses cannot cause ground to be put on the error bus 393. This is because the error bus is not connected to lead 396 until there has been time for the second pulse of the pair to arrive and remove from lead 396 the ground that was put on by the first pulse.

Reference to the relay armature group E1 to E6 will show that if a single code pulse is received, whether pulse 0, pulse 1, pulse 2 or pulse 3, ground will be put on lead 396 and also on the error bus 393 as soon as the arm of commutator 397 reaches the conducting segment 399. Reception of a second code pulse will take ground off lead 396. Reception of a third code pulse will again put ground on the lead 396. Reception of a fourth code pulse will again take ground off the lead 396, but this code transmission error will be indicated by the top line of armatures putting ground on the lead 394 and, therefore, on the error bus 393. Thus, an error is indicated unless the received code consists of two and only two code pulses.

REPLY ROUTING

In the foregoing description it was explained how transmission from an aircraft of a particular reply code causes ground to be removed from a corresponding bus lead, such as bus lead 382 (Fig. 1). The bus leads for automatic acknowledgement and for manual acknowledgement are indicated by the legends "Auto. Ack." and "Man. Ack.," respectively. The four bus leads for execution acknowledgement are marked 382, 402, 403, and 404.

The reply decoder performs a decoding operation once each picture line, clearing itself at the end of each picture line so that it may decode again during the next picture line. It therefore is available for decoding the reply code transmitted on any of the time multiplex channels.

It is evident that when the reply code for a particular channel is received and decoded, the decoded reply must be routed to the proper lamp panel via the acknowledgement request unit for that channel. If, as has been assumed, an aircraft replies over channel 52 (for which the time interval of line 56 has been assigned) then the decoded reply set up on one of the buses 382, 402, et cetera (by taking ground off it) must be routed to the acknowledgement request unit 308 and lamp panel 16 in channel 52 (Fig. 2).

This routing of the reply is done by means of a commutator 406 and by means of a reply routing relay for each channel. The reply routing relays for channels 51 and 52, shown by way of example, are shown at 407 and 408, respectively.

The commutator 406 comprises a conducting segment for each channel, the segments being angularly positioned to correspond to the picture lines. The commutator 406 has a rotatable arm 409 mounted on a shaft 411 which is driven from the half-speed shaft 64 through a 2 to 1 ratio gear drive. Therefore, the arm 409 is rotated once per picture frame. An idler gear is shown so that the gear drive does not reverse the direction of rotation.

It should be noted that the routing commutator 406 at the reply receiver corresponds to the channel selection commutator 326 (Fig. 4) at the reply transmitter, and that unless the system gets out of synchronism the arms 409 and 329 of these commutators rotate in synchronism.

Referring to Fig. 1, at commutator 406 each segment corresponding to a certain picture line is connected to the reply routing relay in the channel to which the time interval of this line is assigned. For example, the segment that is wiped by arm 409 during picture line 56 is connected through a lead 412 to the relay coil 413 of the channel 52 routing relay 408. Similarly, the segment corresponding to line 55 is connected through a lead 414 to the relay coil 416 of the channel 51 routing relay 407.

Since all the reply routing relays are the same and are similarly connected to the bus leads 382, 402, etc., a description of relay 408 will be sufficient. The relay 408 comprises the relay coil 413 and a bank of seven relay armatures that are spring biased to their upper position. In their upper position the lower six armatures are connected to ground through their associated upper contact points; the top armature 417 is merely disconnected from the error bus.

When the relay coil 413 is energized, the seven associated armatures are pulled down and connected through their lower contact points to the several bus leads. This connects a lead 418 to bus 382, a lead 419 to bus 402, a lead 421 to bus 403, a lead 422 to bus 404, a lead 423 to the manual acknowledgement bus, a lead 424 to the automatic acknowledgement bus, and a lead 426 to the error bus.

The lower six armatures of relay 408 and their associated contacts are of the "make before break" type. Specifically, when an armature is pulled down, it is connected to a bus lead before it is disconnected from ground. As will be described in detail later, if the bottom lamp, for example, on the panel 16 (Fig. 2) has been lighted, it will stay lighted until ground is removed from the lead 418 (Fig. 1).

Now consider the reply routing operation. Each time the routing commutator arm 409 wipes a segment, it pulls down the armatures of the routing relay connected to that segment. The routing relays are energized in sequence, picture line by picture line, and are held energized during the time interval of the assigned picture line. Thus, for channel 52, during line 56 the code reply is being transmitted, the arm 409 is on line 56 segment, and the armatures of relay 408 are being held down for the duration of this picture line 56. If there is an error in the received code, the error bus and the lead 426 are grounded, and the error lamp (top of panel 16) lights.

If the system is operating properly, and a correct two pulse code is transmitted, one of the remaining six buses, such as bus 382, will have ground taken off it and, therefore, ground will be taken off the lead 418. As a result the bottom lamp of panel 16 is extinguished to advise the controller that the pilot has executed certain instructions. Thus, any desired one of the lower five panel lamps of a channel may be extinguished by the pilot pushing a reply button and thereby transmitting a certain code. The next to the top lamp is extinguished at the end of a message by transmission of the automatic acknowledgement code if the equipment is operating properly. If it remains lighted that is a warning that something is wrong.

ACKNOWLEDGEMENT REQUEST UNIT AND PANEL LAMPS

In Fig. 2 there is shown the acknowledgement request unit and the lamp panel that are provided for each channel. Since these units are the same in each channel, it will be sufficient to limit the description to channel 52 by way of example.

Referring to the acknowledgement request unit 308, it includes a code error actuated relay coil 427, an automatic acknowledgement relay coil 428, a manual acknowledgement coil 429, and an execute reply relay coil 431. There are three other execute reply relay coils corresponding to coil 431. Since they have the same circuits as those for coil 431 they are not illustrated.

The seven lamps on panel 16 may be incandescent lamps, for example, each having one terminal connected through a lead 432 to one terminal of a current source not shown. The other terminal of each lamp is connected to the armature of a relay which, when energized, connects said other terminal to ground and thus to the other terminal of said current source.

First consider the error lamp circuit. This is unlike the others since it is lighted in response to an error, whereas the other six lamps are lighted by reply requests and extinguished upon receipt of corresponding reply codes. If there is an error in the reply code, ground is put on lead 426 as previously described and coil 427 is energized. The two associated relay armatures 433 and 434 are pulled against their contacts and held there by the holding circuit through armature 433 and a switch 436. The error lamp is lighted by the circuit completed through armature 434. It will remain lighted until the controller clears the circuit by pushing a button 437 to open momentarily the switch 436 in the holding circuit.

Next consider the manual acknowledgement lamp M and its associated circuit. If the controller wants manual acknowledgement of a message he is to transmit, he pushes the manual acknowledgement request button 311 as part of his message display set up. This lights the lamp M which is one of the lower five lamps picked up by the camera 11 for transmission along with the message set up on the display board 13.

The lamp M is lighted by the following circuit operation. When button 311 is pushed down it pushes down two switch arms 438 and 439 which spring back when button 311 is released. Both switch arms are connected to ground. At switch arm 439 an energizing circuit for coil 429 is closed so that relay armatures 441 and 442 are pulled to their closed positions. Lamp M is lighted by closing of armature 442. Coil 429 is held energized by a holding circuit through armature 441 and the lead 423, it being remembered that lead 423 is connected to ground until a reply code takes ground off it at the reply decoder (Fig. 1). Therefore, when the manual acknowledgement reply code is transmitted, ground is taken off lead 423, relay coil 429 is de-energized, and lamp M is extinguished.

Reviewing briefly the sequence of pictorial transmission and acknowledgement reply, the message display for channel 52 is set up on the display board 13. This, in the present instance, includes lighting lamp M. The controller then pushes the channel activate button 111 (Fig. 2), the pictorial message is transmitted and is received at the aircraft receiving on channel 52. The pilot, when he looks at the message on the storage tube screen 34 (Fig. 3) sees the lighted lamp M opposite the address legend. (See Fig. 5.) He pushes the manual acknowledgement button 301 (Fig. 4) whereby the reply code 0, 2 is transmitted. This reply transmission occurs during picture line 56 in the example given. At the ground station, the reception of reply code 0, 2 operates the reply decoder (Fig. 1) to take ground off the lead 0–2 and thus off the lead 423 during the multiplex time interval assigned to channel 52, namely, during the time interval of line 56.

Refer now to the automatic acknowledgement lamp, marked "Auto. Ack.," and its associated circuit. Whenever the manual acknowledgement request button 311 (or any of the four execution acknowledgement buttons below it) is pushed down, automatic acknowledgement is also requested. For example, if button 311 is pushed down, a circuit through switch arm 438 is completed to energize coil 428. This pulls the two associated relay armatures into closed position to light the "Auto. Ack." lamp and to hold coil 428 energized through a holding circuit. The holding circuit is completed through the normally grounded lead 424. As previously explained, receipt of the automatic acknowledgement reply code takes ground off lead 424 momentarily to release the relay 428 and extinguish the "Auto. Ack." lamp. The same action takes place if an execution acknowledgement request button is pushed.

Refer now to the execution acknowledgement request lamps and their associated circuits. These are the lower four lamps on the panel 16. Since the circuits for the four lamps are duplicates, the circuit for only one lamp is shown.

When execution acknowledgement request button 443, for example, is pushed down and released, three switch arms go to their closed positions momentarily and then go back to their open positions. In their closed positions, these switch arms cause energization of relay coils 431, 429, and 428. Thus, when an execution request button is pushed down, the controller calls (1) for acknowledgement that he has executed certain instructions and (2) for manual acknowledgement of receipt of the message. Also, he lights the "Auto. Ack." lamp so that he is advised whether the system is operating properly to cause the message to be displayed on the storage tube screen at the aircraft.

Energization of relay coil 431 pulls the associated relay armatures 444 and 446 closed to light an execution acknowledgement lamp and to close a holding circuit to keep the lamp lit. This holding circuit is completed through the normally grounded lead 422. Transmission of the proper reply code takes ground off lead 422 momentarily releases the holding circuit, and extinguishes the lamp. Specifically, if the pilot pushes execution reply button 302 (Fig. 4) thereby transmitting the two code pulses 0 and 3, ground will be taken off lead 422 momentarily, and the fourth lamp from the bottom on panel 16 will be extinguished. Thus, the controller knows that the instructions written opposite said lamp have been executed.

Fig. 5, previously referred to, shows an example of transmitted information that appears on the cathode ray indicator tube of the aircraft equipment. Five legends are shown. At the left of four of them a black dot or disc represents a lighted lamp calling for a reply.

The five legends (with the lamps) give the following information:

(1) *The address legend AM 329.*—American Airlines Flight 329; a change has been made in your clearances since you last acknowledged reading a message.

(2) *The clearance legend PRD 47.*—You are cleared to proceed to fix 47; this has been changed since you last notified us that you had taken action to implement a clearance.

(3) *The heading legend TL 165.*—Turn left to Heading 165; this has been changed since you last notified us you had followed heading device.

(4) *The altitude assignment legend MA 043.*—Maintain altitude at 4300 feet; no change has been made since you last notified us you had implemented an altitude assignment.

(5) *The beacon legend BECH 8.*—Switch beacon to code channel 8; this has been changed since you last notified us you had set up an assigned code.

The fifth legend, which has been referred to as a beacon legend in the example given, is provided for general utility purposes. A good use for the legend where the aircraft are carrying beacons or transponders is the one illustrated. It will be understood that such beacons are separate pieces of aircraft equipment and are no part of the equipment comprising the present invention.

It should be understood that the present invention is not limited to the particular example that has been described specifically for the purpose of illustration. For instance, the system as illustrated employs commutators. Instead of commutators, it may be preferred to employ electronic means such as binary counters, pulse coincidence circuits, etc. Similarly, the mechanical relays may be replaced by vacuum tube or transistor relays and the like. Also, the invention is not limited to a system employing rectangular or television type scanning. For example, polar or P.P.I. type scanning may be employed. In any case, the picture transmitted and received is built up by a plurality of scanning lines.

What is claimed is:

1. In a system for communication between a first point and a second point, means for transmitting a picture from said first point by transmission during a picture frame period of signals corresponding to line-by-line scanning of said picture, said means including means for transmitting picture synchronizing pulses, picture receiver means for receiving at said second point said signals and synchronizing pulses and displaying at said second point a picture built up by said transmitted signals, time multiplex transmission means at said second point for transmitting information to said first point during only a fraction of a picture frame period, said fraction being not more than a small percentage of the total number of lines in one picture frame period, time multiplex reception means at said first point for receiving said information, said time multiplex transmission means including means under the control of the picture synchronizing pulses received by said picture receiver means for establishing the time multiplex channels.

2. In a system for communication between a picture transmission point and a picture reception point, means for transmitting a picture from said first point, said means including means for transmitting picture synchronizing pulses, picture receiver means for receiving and displaying said picture at said second point, reply transmission means at said picture reception point for transmitting information to said picture transmission point during a selected time interval, reply reception means at said picture transmission point for receiving said information, said reply transmission means including means under the control of the picture synchronizing pulses received by said picture receiver means for effecting transmission of said information during said selected time interval, and said reply reception means including a plurality of reception channels and also including means under the control of said synchronizing pulses for passing the information received during a selected time interval to a reception channel assigned to said selected time interval.

3. A communication system for two-way transmission between two points, said system comprising a television transmitter at one of said points, said transmitter including means for generating and transmitting picture frame synchronizing pulses and picture line synchronizing pulses, a television receiver at the other of said points for receiving a picture transmitted by said transmitter, said receiver including storage tube means for presenting the received picture to a viewer for a substantial time after transmission of the picture has been discontinued, a reply transmitter at said picture reception point, means under the control of the frame and line synchronizing pulses for transmitting signal from said reply transmitter only during a selected fraction of the picture frame period, a reply receiver at said picture transmission point for receiving signal from said reply transmitter, a plurality of channels to a selected one of which the reply signal may be routed, and means operated in synchronism with the frame and line synchronizing pulses for routing the reply signal to a channel assigned to signals that are transmitted during said selected fraction of the picture frame period.

4. In combination, a television transmitter comprising a plurality of picture signal channels, means for transmitting single-frame picture signals from said signal channels successively in any desired sequence of channels, means for transmitting an address code immediately preceding the picture signals corresponding to each picture frame whereby the picture signal from the particular signal channel then transmitting may be received only by a television receiver adjusted for reception on said particular channel, means for also transmitting picture synchronizing signals for maintaining synchronization of the transmitted and received picture, and means for making said picture transmitting means effective to transmit picture signals only after said address code has been transmitted.

5. The invention according to claim 4 wherein means is provided for activating said signal channels in any desired sequence for transmission of picture signals therefrom and wherein means is provided to insure that after one of said channels is activated the signals therefrom must be transmitted before another of said channels is activated.

6. Station apparatus comprising in combination, a transmitter comprising means for transmitting picture signals, picture line synchronizing signals and picture frame synchronizing signals, and a reply code receiver, said receiver including a plurality of reply signal channels, and means for routing a code reply to a pre-assigned channel in accordance with the time interval during which said code reply is received, said time interval being a fraction of a picture frame period, and means for operating said routing means in synchronism with said line and frame synchronizing signals.

7. Station apparatus comprising in combination, a transmitter comprising means for transmitting picture signals, picture line synchronizing signals and picture frame synchronizing signals, and a reply code receiver comprising a plurality of reply signal channels, and means for routing a code reply to a pre-assigned channel in accordance with the time interval during which said code reply is received, said time interval being a fraction of a picture frame period, decoder means for decoding the code reply, and means for operating both said decoder means and said routing means in synchronism with said line and frame synchronizing signals.

8. The invention according to claim 7 wherein there are a plurality of picture signal channels corresponding to said reply signal channels, means for setting up a picture message for each of said picture signal channels, means for setting up a reply request that is included in each of said picture messages, means for activating said picture signal channels in any desired sequence for transmission of the message set up for the activated channel, and means responsive to the reply signals routed over a reply channel for indicating that a reply has been made.

9. Station apparatus comprising in combination, a transmitter comprising means for transmitting picture signals, picture line synchronizing signals and picture frame synchronizing signals, and a reply code receiver comprising decoder means for decoding time spaced code pulses, a plurality of reply signal channels, and means for routing a reply to a pre-assigned channel in accordance with the time interval during which said reply is received, said time interval being a fraction of a picture frame period, and means for operating both said decoder means and said routing means in synchronism with said line and frame synchronizing signals.

10. In combination, a television transmitter comprising a plurality of picture signal channels, means for transmitting single-frame picture signals from said signal channels successively in any desired sequence of channels, means for transmitting an address code immediately preceding the picture signals corresponding to each picture frame whereby the picture signal from the particular signal channel then transmitting may be received only by a television receiver adjusted for reception on said particular channel, means for also transmitting picture synchronizing signals for maintaining synchronization of the transmitted and received picture, and means for making said picture transmitting means effective to transmit picture signals only after said address code has been transmitted, a reply code receiver at the same location as said television transmitter for receiving information transmitted from the picture reception point during selected time intervals which are each a fraction of a picture frame period, said reply code receiver comprising a plurality of signal receiving channels corresponding to said picture signal channels, and means operated in synchronism with said picture synchronizing signals for passing a received reply message into a pre-assigned receiving channel during a certain one of said selected time intervals.

11. Station apparatus comprising in combination, a picture receiver for receiving on the same carrier wave picture signals and picture synchronizing pulses which comprise picture frame synchronizing pulses and line synchronizing pulses, a time multiplex transmitter for transmitting a message during a selected time interval which is a fraction of a picture frame time interval, said fraction being not more than a small percentage of the total number of lines in one picture frame period, and means under the control of the picture synchronizing pulses received by said picture receiver for effecting transmission of said message during said fraction of a picture frame time interval.

12. The invention according to claim 11 wherein means is provided for setting up a message to be transmitted during said time interval.

13. The invention according to claim 12 wherein means is provided to insure that a message that has been set up will be transmitted before another message is set up.

14. Station apparatus comprising in combination, a picture receiver for receiving picture signals and picture synchronizing pulses which comprise picture frame synchronizing pulses and line synchronizing pulses, means for displaying a picture corresponding to said picture signals, a time multiplex transmitter for transmitting a message during a selected time interval which is a fraction of a picture frame time interval, said fraction being not more than a small perecntage of the total number of lines in one picture frame period, and means under the control of the picture synchronizing pulses received by said picture receiver for effecting transmission of said message during said fraction of a picture frame time interval.

15. Station apparatus comprising in combination, a picture receiver for receiving picture signals and picture synchronizing pulses which comprise picture frame synchronizing pulses and line synchronizing pulses, means including a cathode ray storage tube for displaying a picture corresponding to said picture signals, a time multiplex transmitter for transmitting a message during a selected time interval which is a fraction of a picture frame time interval, said fraction being not more than a small percentage of the total number of lines in one picture frame period, and means under the control of the picture synchronizing pulses received by said picture receiver for effecting transmission of said message during said fraction of a picture frame time interval.

16. In combination, a receiver for receiving picture signals and picture synchronizing pulses which comprise picture frame synchronizing pulses and line synchronizing pulses, means for displaying a picture corresponding to said picture signals, a transmitter at the same location as said receiver for transmitting a message during a selected time interval which is a fraction of a picture frame time interval, said fraction being not more than a small percentage of the total number of lines in one picture frame period, manual selective means for setting up at the will of an operator a message to be transmitted during said time interval, and means under the control of the synchronizing pulses received by said receiver for effecting transmission of said message during said time interval.

17. In combination, a receiver for receiving picture signals and picture synchronizing pulses, means for displaying a picture corresponding to said picture signals, a transmitter at the same location as said receiver for transmitting a message during a selected time interval, means for setting up a message to be transmitted during said time interval, and means under the control of said synchronizing pulses for effecting transmission of said message during said time interval, and wherein protective means is provided to prevent transmission of a message in response to failure of said last means to remain in synchronism with the received synchronizing pulses.

18. In combination, a receiver for receiving picture signals and picture synchronizing pulses which comprise picture frame synchronizing pulses and line synchronizing pulses, means for displaying a picture corresponding to said picture signals for a plurality of picture frames after transmission of said picture signals, a transmitter at the same location as said receiver, said transmitter including means for transmitting a message during a selected fraction of a picture frame, said fraction being not more than a small percentage of the total number of lines in one picture frame period, and means under the control of the synchronizing pulses received by said receiver for effecting transmission of said message during said selected fraction of a picture frame.

19. The invention according to claim 18 wherein there is provided a manual channel selector means for determining the particular fraction of a picture frame during which said message is transmitted.

20. In combination, a receiver for receiving picture signals and picture synchronizing signals, said picture signals corresponding to line-by-line scanning of a picture, means for displaying by means of line-by-line scanning a picture corresponding to said picture signals, said means including means responsive to the synchronizing signals for maintaining the displayed picture in line and frame synchronism with the transmitted picture, means for causing received picture signals to be displayed on said display means, a transmitter at the same location as said receiver, means for setting up a message to be transmitted by said transmitter during a time interval that is a fraction of a picture frame period, said fraction being not more than a small percentage of the total number of lines in one picture frame period, and means under the control of the picture synchronizing signals received by said receiver for causing said transmitter to transmit said message during said fraction of a picture frame period.

21. In combination, a receiver that is to be airborne for receiving picture signals, picture synchronizing signals, and address code signals from a ground station, means for displaying a picture corresponding to said picture signals, said means including means responsive to the synchronizing signals for maintaining the displayed picture in line and frame synchronism with the transmitted picture, means responsive to a predetermined one of said address code signals for causing received picture signals to be displayed on said display means, a transmitter, means for setting up a message to be transmitted by said transmitter during a short time interval, and means under the control of the picture synchronizing signals received by said receiver for causing said transmitter to transmit said message during an assigned time interval.

22. The invention according to claim 21 wherein manual address code selector means is provided for determining the particular received picture signals that are to be displayed as a picture, and wherein manual transmission channel selector means is provided for determining the particular fraction of a picture frame during which said message is transmitted.

23. In combination, a receiver for receiving picture signals, picture synchronizing signals, and address code signals, said picture signals corresponding to line-by-line scanning of a picture, means including a cathode ray storage tube for displaying by means of line-by-line scanning a picture corresponding to said picture signals for a substantial period, said means also including means responsive to the synchronizing signals for maintaining the displayed picture in line and frame synchronism with the transmitted picture, address decoder means responsive to a predetermined one of said address code signals for causing received picture signals to be displayed on said display means, a transmitter at the same location as said receiver, means for setting up a message to be transmitted by said transmitter during a short time interval, and means under the control of the picture synchronizing signals received by said receiver for causing said transmitter to transmit said message during an assigned time interval.

24. In combination, a receiver for receiving picture signals, picture synchronizing signals, and address code signals, means including a cathode ray storage tube for displaying a picture corresponding to said picture signals for a substantial period, said means also including means responsive to the synchronizing signals for maintaining the displayed picture in line and frame synchronism with the transmitted picture, address decoder means responsive to a predetermined one of said address code signals for causing received picture signals to be displayed on said display means, a transmitter at the same location as said receiver, means for setting up a message to be transmitted by said transmitter during a short time interval, and means under the control of said picture synchronizing signals for causing said transmitter to transmit said message during an assigned time interval, and wherein means is provided for erasing any picture previously stored on said storage tube in response to the reception of said predetermined address code signal.

25. In a time multiplex communication system for transmission from a transmitting point to a receiving point, means at the receiving point for generating time multiplex channel control pulses, means for transmitting said control pulses to said transmitting point, a receiver at said transmitting point for receiving said control pulses, a communication transmitter at said transmitting point, means at said transmitting point under the control of said received control pulses for transmitting signal from said communication transmitter only during a selected time interval, said last means including a synchronizing pulse generator which is synchronized by said control pulses received at said transmitter, means for preventing transmission of a message in the event that said synchronizing pulse generator falls out of synchronism with said control pulses, a communication receiver at said receiving point for receiving signal from said communication transmitter, a plurality of channels at said receiving point to a selected one of which said received signal may be routed, and means at said receiving point operating in synchronism with said control pulses for routing said received signal to a particular one of said channels assigned to signals that are transmitted during said selected time interval.

26. A time multiplex communication system for transmission from a plurality of transmitting points to a single receiving point, means at the receiving point for generating time multiplex channel control pulses, radio transmitter means for transmitting said control pulses to said transmitting points, a radio receiver at each of said transmitting points for receiving said control pulses, a radio communication transmitter at each of said transmitting points, means at each of said transmitting points under the control of said received control pulses for transmitting signal from the associated radio communication transmitter only during a selected time interval assigned to that particular transmitting point, said last means including a synchronizing pulse generator which produces synchronizing pulses and which is synchronized by said control pulses received at said transmitter, a pulse code generator, means for driving said code generator in synchronism with said synchronizing pulses to generate time spaced code pulses, means under the control of the operator at the transmitter location for determining the time interval during which said transmitter is effective for transmitting a message, and means also under the control of the operator for determining which one of the code signals generated by said code generator will be transmitted during the time interval the transmitter is effective for transmitting a message, a radio communication receiver at said receiving point for receiving signals from said communication transmitters, a plurality of channels at said receiving point to a selected one of which the signal received from a particular communication transmitter may be routed, and means at said receiving point operating in synchronism with said control pulses for routing the signal received from a particular transmitting point to a particular one of said channels that is assigned to translate the signals which are transmitted during said selected time interval assigned to said particular transmitting point.

References Cited in the file of this patent

UNITED STATES PATENTS

| | | |
|---|---|---|
| 2,314,471 | Wright | Mar. 23, 1943 |
| 2,490,268 | Herbst | Dec. 6, 1949 |
| 2,527,967 | Schrader | Oct. 31, 1950 |
| 2,530,957 | Gilman | Nov. 21, 1950 |
| 2,534,844 | Wallace | Dec. 6, 1950 |
| 2,541,076 | Labin et al. | Feb. 13, 1951 |
| 2,586,825 | Jacobsen | Feb. 26, 1953 |
| 2,632,158 | Wallace | Mar. 17, 1953 |
| 2,655,648 | Schrader | Oct. 12, 1953 |